(12) United States Patent  (10) Patent No.: US 8,611,928 B1
Bill  (45) Date of Patent: Dec. 17, 2013

(54) LOCATION-BASED PARENTAL CONTROLS

(75) Inventor: David S. Bill, San Francisco, CA (US)

(73) Assignee: AOL Inc., Dulles, VA (US)

( * ) Notice: Subject to any disclaimer, the term of this patent is extended or adjusted under 35 U.S.C. 154(b) by 1801 days.

(21) Appl. No.: 11/618,689

(22) Filed: Dec. 29, 2006

Related U.S. Application Data

(60) Provisional application No. 60/823,336, filed on Aug. 23, 2006.

(51) Int. Cl.
*H04W 24/00* (2009.01)

(52) U.S. Cl.
USPC ............... 455/456.3; 455/456.1; 455/456.2; 455/414.2; 455/414.3; 455/457

(58) Field of Classification Search
USPC .......... 455/456.3, 456.1, 456.2, 414.2, 414.3, 455/457
See application file for complete search history.

(56) References Cited

U.S. PATENT DOCUMENTS

| 7,069,232 | B1 * | 6/2006 | Fox et al. ..................... 705/10 |
| 2005/0277428 | A1 * | 12/2005 | Brown ..................... 455/456.3 |
| 2008/0075250 | A1 * | 3/2008 | Kent et al. ..................... 379/133 |

* cited by examiner

*Primary Examiner* — Kamran Afshar
*Assistant Examiner* — Sayed T Zewari
(74) *Attorney, Agent, or Firm* — Finnegan, Henderson, Farabow, Garrett & Dunner, LLP

(57) ABSTRACT

An entity acting as a parent (e.g., a parent, a guardian, a school, an athletic organization, or a combination thereof—referred to as a parent or a supervising entity) may restrict a mobile device (e.g., a mobile telephone, a laptop, a PDA, a text messaging device, a two-way radio, a hand-held computer, or an mp3 player), or certain functionalities of a mobile device (e.g., text messaging, instant messaging, telephone calls, email capabilities, or playing music), that is being used by a child (referred to as a child or a supervised entity) while the child is at a current location. Similar mobile device restrictions may be used with other users, such as, for example, an employer and an employee, a secure government site and a visitor to the site, and a business and a customer.

22 Claims, 16 Drawing Sheets

600
Parental Control Definitions

LOCATIONS /610

620 1. Label  school /621
   Address  1300 N Quincy St. /622          [EDIT] /624   [DELETE] /625
     + radius  500 yards /623
630 2. Label  lessons /631
   Address  425 K St. NW /632              [EDIT] /634   [DELETE] /635
     + radius  2 miles /633
640   Enter New: Label  church /641
           Address _____ /642              (select on map) /644
             + radius _____ /643           (look-up by name) /645

PEOPLE /650

660  1. Label  students /661 ; Includes    | all @ school.edu ←663
                                           | listed in file school.doc ←664
                                           | named by school ←665      /662
                                           | add more... ←666

670  2. Label  parents /671 ; Includes     | Mom ←673
                                           | Dad ←674      /672
                                           | add more... ←675

FIG. 6

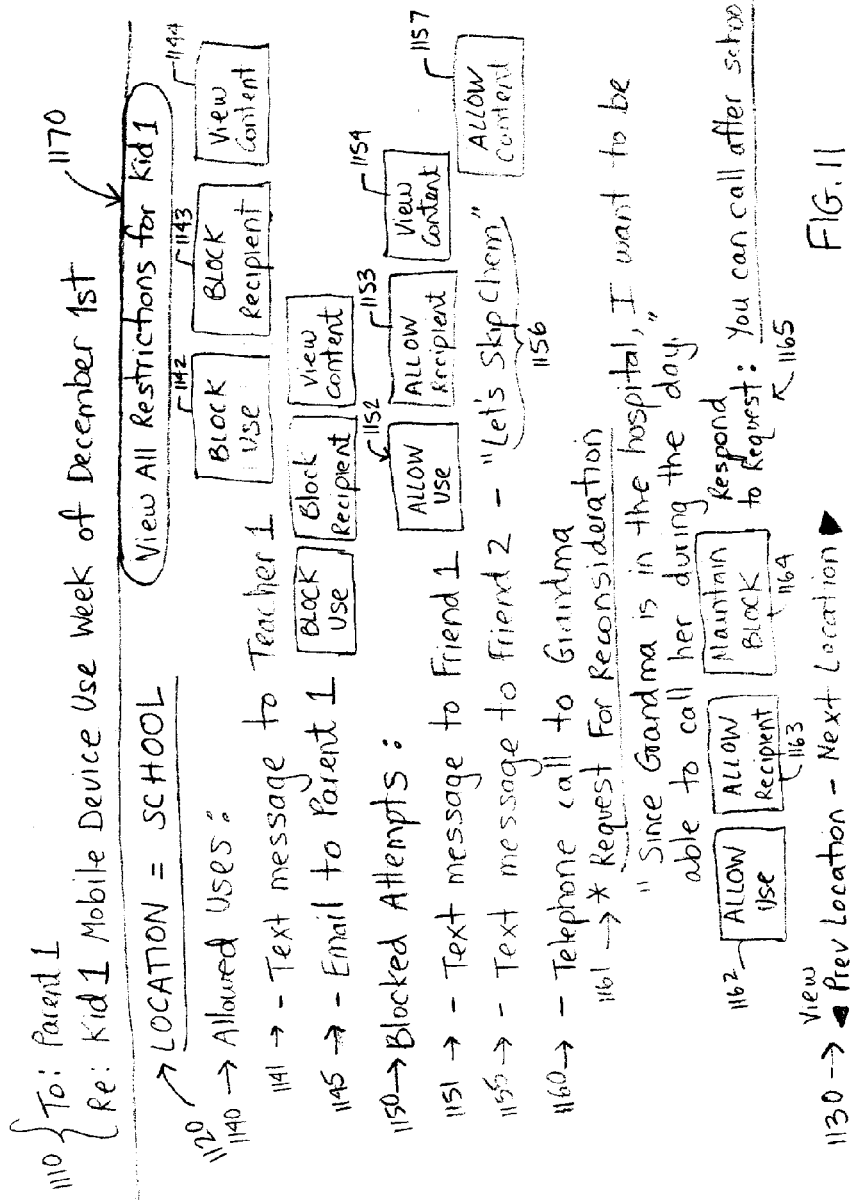

LOCATION-BASED PARENTAL CONTROLS

CROSS REFERENCE TO RELATED APPLICATIONS

This application claims the benefit of U.S. Provisional Application No. 60/823,336, filed Aug. 23, 2006, and titled "Parental Controls for a Device Based on Geolocation of the Device," which is incorporated herein by reference in its entirety.

TECHNICAL FIELD

This application relates to parental controls for a device based on a geolocation of the device.

BACKGROUND

Parental controls can be applied to a child's use of electronic devices, such as, televisions, computers, and mobile devices. A parent can use parental controls to define content that a child is allowed to receive or view, as well as content that the child is restricted from receiving or viewing.

SUMMARY

In a first general aspect, parental controls for a mobile device used by a child are registered. A geographic location having an associated boundary and a configuration instruction related to one or more functionalities of the mobile device and the geographic location are received from a parent of the child. The configuration instruction is used to regulate how the mobile device is used by the child when the child is located at the geographic location.

With respect to at least the first general aspect, implementations may include one or more of the following features. For example, a graphical user interface that includes providing an interactive map may be provided to the parent. The geographic location may be received from the parent by receiving a selection of a particular address associated with the geographic location and a boundary associated with the particular address.

An instant messaging communications session window and a co-user list may be provided to the parent. A selection of an identifier associated with parental controls from among a list of identifiers in the co-user list may be received from the parent. A parental control command in the form of an instant message may be received from the parent via the instant messaging communications session window. The parental control command may include the geographic location and the configuration instruction.

A text message creation screen may be provided on the display of a mobile device. A text message that includes the geographic location and the configuration instruction may be received from the parent.

A graphical user interface may be provided to the parent on a display of the mobile device used by the child providing. The mobile device may include a mobile telephone, a personal digital assistant, a text messaging device, a laptop computer, or a hand-held computer.

A graphical user interface may be provided to the parent on a display of a mobile device other than the mobile device used by the child. The mobile device may include a mobile telephone, a personal digital assistant, a text messaging device, a laptop computer, or a hand-held computer.

Receiving, from the parent, the configuration instruction related to the one or more functionalities of the mobile device may include receiving, from the parent, the configuration instruction related to at least one of a communications functionality and a non-communications functionality of the mobile device. Receiving, from the parent, the configuration instruction related to the communications functionality of the mobile device may include receiving, from the parent, the configuration instruction related to at least one of a telephone call, a text message, a picture message, an instant message, an email, initiation of a two-way radio session, and posting of information to the Internet. Receiving, from the parent, the configuration instruction related to the non-communications functionality of the mobile device may include, receiving, from the parent, the configuration instruction related to at least one of recording music, recording video, taking a picture, playing games, playback of music, playback of video, calendaring, alarm setting, note taking, and using a calculator.

In a second general aspect, parental controls for communications by a child are registered. A geographic location having an associated boundary and a configuration instruction related to one or more modes of communication and the geographic location are received from a parent of the child. The configuration instruction is used to regulate how the child communicates with others using the one or more modes of communication when the child is located at the geographic location.

With respect to at least the second general aspect, implementations may include one or more of the following features. For example using the configuration instruction to regulate how the child communicates with others using the one or more modes of communication may include using the configuration instruction to regulate how the child communications with others using the one or more modes of communication in association with a particular device associated with the child. Using the configuration instruction to regulate how the child communicates with others using the one or more modes of communication may include using the configuration instruction to regulate how the child communications with others using the one or more modes of communication in association with more than one particular devices associated with the child. Using the configuration instruction to regulate how the child communicates with others using the one or more modes of communication may include using the configuration instruction to regulate how the child communications with others using the one or more modes of communication in association with any device that may be used by the child after the child's identity is determined by the device.

A graphical user interface that includes providing an interactive map may be provided to the parent. The geographic location may be received from the parent by receiving a selection of a particular address associated with the geographic location and a boundary associated with the particular address.

An instant messaging communications session window and a co-user list may be provided to the parent. A selection of an identifier associated with parental controls from among a list of identifiers in the co-user list may be received from the parent. A parental control command in the form of an instant message may be received from the parent via the instant messaging communications session window. The parental control command may include the geographic location and the configuration instruction.

A text message creation screen may be provided on the display of a mobile device. A text message that includes the geographic location and the configuration instruction may be received from the parent.

A graphical user interface may be provided to the parent on a display of a mobile device. The mobile device may include a mobile telephone, a personal digital assistant, a text messaging device, a laptop computer, or a hand-held computer.

Receiving, from a parent of the child, the configuration instruction related to one or more modes of communication may include receiving, from a parent of the child, a configuration instruction related to sending a text message, sending a picture message, sending an instant message, sending an email message, placing a telephone call, initiating a two-way radio session, or posting information to the Internet.

In a third general aspect, communications by a child are restricted. An attempt by the child to communicate with a particular user is detected. In response to determining a mode of communication associated with the attempt and a device associated with the attempt, a current location of the child is determined. A set of restrictions provided by a parent of the child are accessed. Based on the set of restrictions, the child is selectively enabled to communicate with the particular user while the child is at the current location.

With respect to at least the third general aspect, implementations may include one or more of the following features. For example, accessing a set of restrictions may include accessing a set of restrictions that include restrictions based on at least one of a mode of communication, a device, and an identity of a child.

Selectively enabling the child to communicate with the particular user may include determining that the attempt is associated with a mode of communication that is restricted while the child is at the current location and/or a device that is restricted while the child is at the current location, determining that the particular user is a restricted recipient while the child is at the current location, and, based on the determination, restricting the child from communicating with the particular user while the child is at the current location.

Selectively enabling the child to communicate with the particular user may include determining that the attempt is associated with a mode of communication that is not restricted while the child is at the current location, determining that the attempt is associated with a device that is not restricted while the child is at the current location, determining that the particular user is not a restricted recipient while the child is at the current location, and enabling the child to communicate with the particular user using the mode of communication and the device while the child is at the current location.

Selectively enabling the child to communicate with the particular user may include determining that the particular user is not a restricted recipient while the child is at the current location, determining that the attempt is associated with a mode of communication that is restricted while the child is at the current location and/or a device that is restricted while the child is at the current location, and enabling the child to communicate with the particular user while the child is at the current location using a mode of communication or a device other than the mode of communication and the device associated with the attempt.

Determining a mode of communication associated with the attempt may include determining that the attempt is associated with sending a text message, sending a picture message, sending an instant message, sending an email message, placing a telephone call, initiating a two-way radio session, or posting information to the Internet. Determining a device associated with the attempt may include determining that the attempt is associated with at least one of a device associated with the child and a device that can identify the child as the user of the device.

Determining the current location of the child may include inferring the current location of the child based on a current location of the device. Inferring the current location of the child based on a current location of the device may include determining the current location of the device based on a global positioning system (GPS) associated with the mobile device. Inferring the current location of the child based on a current location of the device may include determining the current location of the device based on a nearest tower or tower triangulation technique.

Determining the current location of the child may include determining the current location of the child based on an access made by the child to enter a particular location, wherein the access is made using a key fob or security card. Determining the current location of the child may include determining the current location of the child based on the child being authenticated on a device whose current location is known. Determining the current location of the child may include determining the current location of the child based on current location information provided by the child.

Accessing the set of restrictions may include accessing the set of restrictions from a storage location that is local to a device using which the child made the attempt. Accessing the set of restrictions may include accessing the set of restrictions from a storage location that is remotely accessible by a device using which the child made the attempt. Accessing the set of restrictions may include routing a request associated with the attempt through an intermediary for consideration.

Selectively enabling the child to communicate with the particular user while the child is at the current location may include determining that the child cannot communicate with the particular user while the child is at the current location, and blocking the attempt. The parent may be provided with an indication that the child attempted to communicate with the particular user while the child is at the current location. The child may be enabled to respond to the blocking of the attempt with a request for reconsideration that includes a reason why the child should be allowed to communicate with the particular user while the child is at the current location. The request for reconsideration may be provided to the parent. The parent may be enabled to update the set of restrictions based on the request for reconsideration. Providing the request for reconsideration to the parent may include providing the request for reconsideration to the parent via instant message, text message, email, as part of a graphical user interface configured to receive the set of restrictions, or as a voice message.

In a fourth general aspect, controls for a mobile device used by a supervised entity are registered. A geographic location having an associated boundary and a configuration instruction related to one or more functionalities of the mobile device and the geographic location are received from a supervising entity associated with the supervised entity. The configuration instruction is used to regulate how the mobile device is used by the supervised entity when the supervised entity is located at the geographic location.

With respect to at least the fourth general aspect, implementations may include one or more of the following features. For example, using the configuration instruction to regulate how the mobile device is used by the supervised entity when the supervised entity is located at the geographic location may include using the configuration instruction to determine which of the supervising entity and the supervised entity pays costs associated with the supervised entity using the mobile device when the supervised entity is located at the geographic location.

In a fifth general aspect, controls for communications by a supervised entity are registered. A geographic location having an associated boundary and a configuration instruction related to one or more modes of communication and the geographic location are received from a supervising entity associated with the supervised entity. The configuration instruction is used to regulate how the supervised entity communicates with others using the one or more modes of communication when the supervised entity is located at the geographic location.

With respect to at least the fifth general aspect, implementations may include one or more of the following features. For example, using the configuration instruction to regulate how the supervised entity communicates with others using the one or more modes of communication when the supervised entity is located at the geographic location may include using the configuration instruction to determine which of the supervising entity and the supervised entity pays costs associated with the supervised entity communicating with others using the one or more modes of communication when the supervised entity is located at the geographic location.

In a sixth general aspect, communications by a supervised entity are restricted. An attempt by the supervised entity to communicate with a particular user is detected. In response to determining a mode of communication associated with the attempt and a device associated with the attempt, a current location of the supervised entity is determined. A set of restrictions provided by a supervising entity associated with the supervised entity are accessed. Based on the set of restrictions, the supervised entity is selectively enabled to communicate with the particular user while the supervised entity is at the current location.

With respect to at least the sixth general aspect, implementations may include one or more of the following features. For example, the supervised entity may be enabled to communicate with the particular user while the supervised entity is at the current location. Based on the set of restrictions, whether the supervising entity or the supervised entity pays for costs associated with the supervised entity communicating with the particular user while the supervised entity is at the current location may be determined.

With respect to at least the fourth, fifth, and sixth general aspects, implementations may include one or more of the following features. For example, the supervising entity may be a parent, guardian, or relative and the supervised entity may be a child of the parent or a child under the care of the guardian or relative.

The supervising entity may be an employer, and the supervised entity may be an employee. The geographic location may be a location of an employment site or a location of a client site.

The supervising entity may be a school administrator, and the supervised entity may be a student. The geographic location may be a location of a school associated with the school administrator and which is attended by the student.

The supervising entity may be an administrator of a secure government site, and the supervised entity may be a visitor to the secure government site or an employee of the secure government site. The geographic location may be a location of the secure government site.

The supervising entity may be a library administrator, the supervised entity may be a library patron, and the geographic location may be a location of a library.

The supervising entity may be a business administrator, the supervised entity may be a customer of the business, and the geographic location may be a location of the business.

The supervising entity may be a network administrator, and the supervised entity may be a network user.

The supervising entity may be a wireless service provider administrator, and the supervised entity may be a consumer of the wireless service provided by the wireless service provider.

Implementations of any of the techniques described may include a method or process, an apparatus or system, or computer software on a computer-accessible medium. The details of particular implementations are set forth below. Other features will be apparent from the description and drawings, and from the claims.

DESCRIPTION OF DRAWINGS

FIG. 6 illustrates an example of a parental control definitions GUI that enables a parent to define and label locations and groups of people.

FIG. 11 illustrates an example of a restriction report that provides a supervising entity with a report of all (or a subset of all) functionality of a mobile device used, or attempted to be used, by a supervised entity while the supervised entity was located at one or more locations.

DETAILED DESCRIPTION

Figure 1:
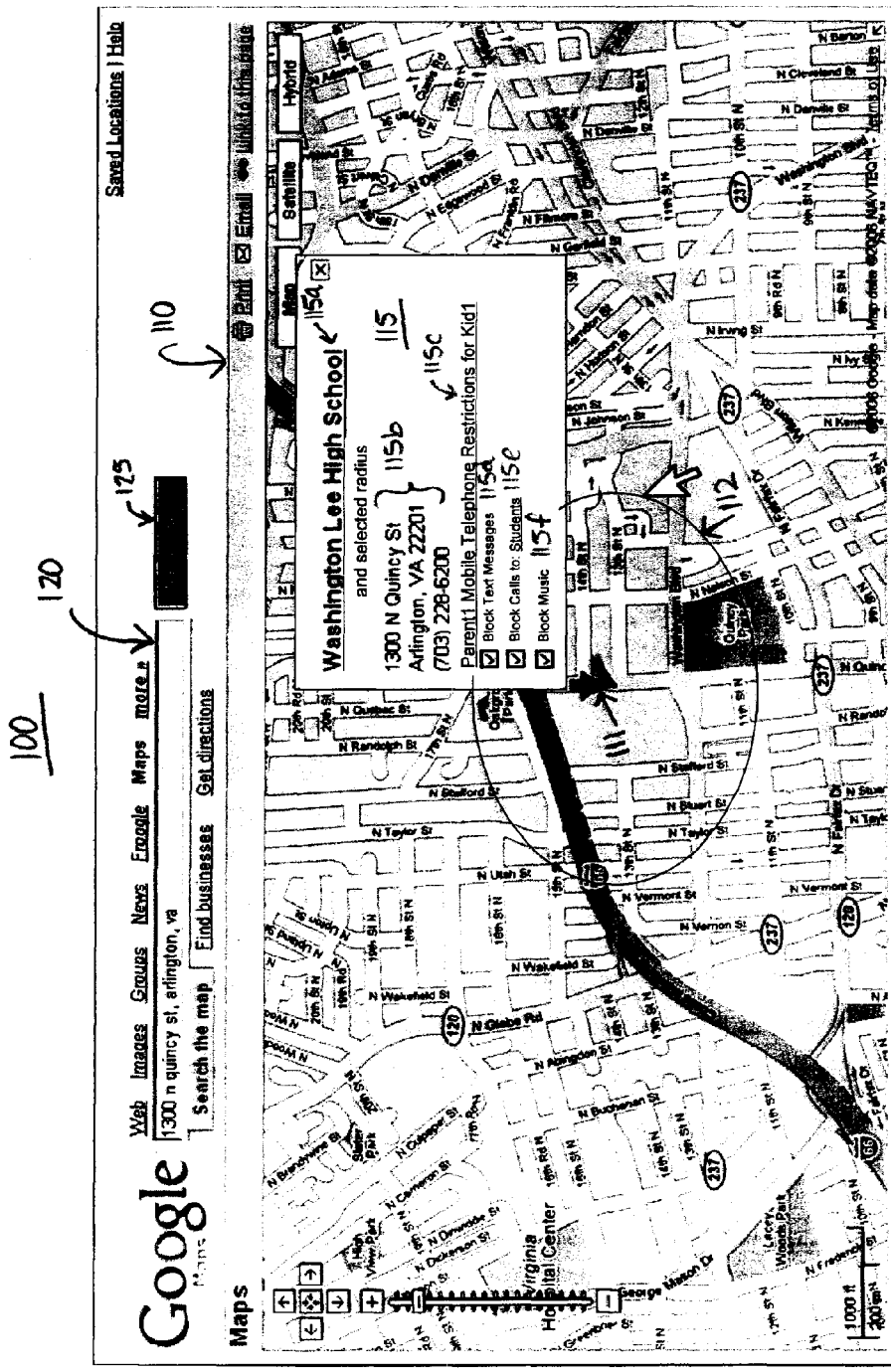
FIG. 1 illustrates an example of a graphical user interface (GUI) that includes an interactive geographical map and enables a supervising entity (e.g., a parent) to register location-based restrictions that regulate the use of a mobile device by a supervised entity (e.g., a child).

Parents want their child to be able to communicate with others (e.g., parents, teachers, coaches, and friends) using a mobile device (e.g., a mobile telephone). However, parents also may wish to control when, how, and with whom the child may do so based on the child's current location. For example, the parent may restrict the child from calling a friend while the child is located at (or near) school or practice, but enable the child to call a teacher or parent (e.g., to ask for help in the case of an emergency), while located at (or near) the same place where restrictions are employed.

An entity acting as a parent (e.g., a parent, a guardian, a school, an athletic organization, or a combination thereof—referred to as a parent or a supervising entity) may restrict a mobile device (e.g., a mobile telephone, a laptop, a PDA, a text messaging device, a two-way radio, a hand-held computer, or an mp3 player), or certain functionalities of a mobile device (e.g., text messaging, instant messaging, telephone calls, email capabilities, or playing music), that is being used by a child (referred to as a child or a supervised entity) based on a current location of the child. The current location may be determined using one or more of a variety of methods. In some implementations, a determination of a location of a mobile device associated with the child (and, thus, a determination of the location of the child) may be made based on use of a global positioning system (GPS) associated with the mobile device or a determination of a tower nearest to the mobile device (using, for example, nearest tower or tower triangulation techniques). In other implementations, a direct determination of a location of the child may be made based on (1) detection of the child entering a particular location (e.g., swiping a key fob or security card to enter a building), (2) self reporting of a location by the child (e.g., the child indicates that the child is located at school), or (3) a deduction of a location of the child based on date and time constraints (e.g., it is assumed that the child is located at school on weekdays during school hours, except during the summer).

Other examples of supervising entity/supervised entity pairs may include an employer and an employee, a secure government site and a visitor (e.g., a civilian with no security clearance, a civilian with some level of security clearance, or a serviceperson (e.g., a member of the military) with a particular degrees of security clearance), a school administrator and a student, a library and a library patron, a business and a customer, a network administrator and a user of the network, and a wireless service provider and a consumer of the wireless service. However, for convenience, a majority of the examples provided in this disclosure may refer to a parent, guardian, or school as a supervising entity and a child as a supervised entity.

The supervising entity may register restrictions in a variety of ways, such as, for example, by registering restrictions remotely via the Internet using a GUI that includes an interactive map within which the supervising entity may indicate geographic locations upon which the restrictions are based. The supervising entity may access a set of locations, a set of people, and a set of functionalities for which the supervising entity can create, edit, or delete restrictions. For example, the supervising entity may restrict a supervised entity's mobile telephone from sending text messages to users that are not included within a "parents" or "teachers" user list, while the mobile telephone (and presumably the supervised entity) is within a certain boundary of a location referred to as "school."

The user lists may be defined and updated by the supervising entity who registered the restriction (e.g., the parent) or by a second supervising entity (e.g., a school). More particularly, particular entities (which may or may not be supervising entities) may create and publish user lists. For example, a school may create and publish a list of students or a list of teachers and a government entity may create and publish a list of emergency contacts (e.g., police, fire, and ambulance contacts). In some implementations, an entity that creates and publishes a user list also may include constraints on how the user list may be used. For example, a user list of emergency contacts may be associated with a constraint whereby a restriction associated with the user list may not block a supervised entity from contacting the members of the user list in order to ensure that a supervised entity may always reach out for help in an emergency.

Once a particular user list is published, supervising entities may subscribe to the particular user list, which may include, for example, receiving automatic updates to the particular user list. By subscribing to a particular user list, a supervising entity may use the user list as part of a restriction. For example, a user list of parent members of a Parent-Teacher Association may be published by a school and used by a parent in a restriction that allows a child to send text messages to members of the list while the child is located at school. The user lists also may be based on, or used as, a contact or co-user list that is unrelated to parental controls (e.g., an AOL® Instant Messenger (AIM®) buddy list).

A supervising entity may receive a restriction report that provides the supervising entity with information associated with actions taken by a supervised entity for whom the supervising entity has registered restrictions. The restriction report may include a list of users with whom the supervised entity communicated, or attempted to communicate, within a particular time period. The restriction report also may include a list of mobile device functionalities that the supervised entity used, or attempted to use, during a particular time period. The information regarding the users with whom the supervised entity sought to communicate (successfully or unsuccessfully) and the information regarding the functionalities the supervised entity used, or attempted to use, may be associated with a location of the supervised entity at the time of the attempted, or actual, use of the mobile device.

The restriction report also may include one or more requests for reconsideration from the supervised entity. A request for reconsideration may be generated by the supervised entity whenever the supervised entity is blocked from using a particular functionality of a mobile device or blocked using the mobile device to communicate to communicate with a particular person. The request for reconsideration may include a request to rescind or adjust a restriction associated with the blocked action and a reason why the supervised entity believes that the restriction should be removed or revised. The restriction report may provide the supervising entity with an opportunity to edit or delete existing restrictions in response to a request for reconsideration, based on a particular functionality or user block, or for some other reason.

GUI 100 of FIG. 1 includes an interactive geographical map 110 that enables a supervising entity (e.g., a parent) to register location-based restrictions on a use of a mobile device by a supervised entity (e.g., a child). In some implementations, GUI 100 may be accessed by a supervising entity via the Internet, for example, by logging into a parental controls web page. A parental controls web page may be associated with a wireless service provider (e.g., a carrier that provides wireless service to the child's mobile device) or a third party parental control service provider (e.g., an intermediary between the parent and the wireless service provider). Additionally, or alternatively, GUI 100 may be accessed over a non-Internet wired or wireless connection.

When accessing GUI 100, the supervising entity may select a location to be associated with a particular restriction. To select the location, the supervising entity may enter an address in text entry box 120. As shown in GUI 100, a supervising entity has indicated the address "1300 N Quincy St, Arlington, Va." Upon entering the address into text entry box 120, and subsequently selecting a "Search Maps" control (e.g., button) 125, the supervising entity is provided with map 110, which indicates the address provided by the supervising entity with an arrow 111.

A supervising entity may seek to create a location-based restriction that is associated with a location that expands beyond a single building or address. For example, a supervising entity seeking to restrict a child's use of a mobile device while the child is located at school may want to include the school building itself (e.g., the school's main address), as well as an appropriate boundary around the school building that includes, for example, school grounds including sports fields, parking lots, and any outer buildings. To do so, the supervising entity may select a boundary (e.g., indicated by a particular radius) around the exact address of a location to be included in the location-based restriction. For example, and as shown in GUI 100, the supervising entity has selected a radius 112 around the address indicated by arrow 111. The supervising entity may select the boundary by drawing a circle, another symmetrical or non-symmetrical shape, or a series of connected, or unconnected lines, around the address, by indicating a particular radius in a text entry box (e.g., by entering "2 mile radius"), or by some other method. In another example, the supervising entity may draw a boundary around an exact address of a location. The boundary may or may not be represented by a geometric shape. For example, the supervising entity may identify such a boundary using a collection of curved or angled lines that may or may not intersect to completely encompass the exact address of the location.

Once the location, and any associated boundary, has been selected by the supervising entity, a restriction summary box 115 is provided to the supervising entity. Restriction summary box 115 indicates the location 115b selected by the user (e.g., "1300 N Quincy Street in Arlington, Va.") and a name 115a for that location, if one is known (e.g., "Washington-Lee High School and selected radius").

The restriction summary box 115 also provides the supervising entity with information about restrictions associated with the selected location. As is shown in GUI 100, the restriction associated with the Washington-Lee High School location is titled "Parent1 Mobile Phone Restrictions for Kid1" 115c. In some implementations, restriction title information may be based on login information provided by the supervising entity in order to access GUI 100. For example, the supervising entity may have logged in as Parent1 and indicated that the supervising entity wanted to create, edit, or delete restrictions for a particular child referred to as Kid1. If Parent1 was associated with more than one child (e.g., Parent1 is the guardian of more than one child or Parent1 is a leader of an after-school club or activity that includes multiple children for whom Parent1 has been given the authority to set restrictions), the supervising entity may have selected child Kid1 from a drop-down menu, a radio button, a checkbox, a text entry box, or by some other means. In some implementations, a supervising entity may edit restriction title 115c by selecting restriction title 115 with a pointing device (e.g., mouse, stylus, or touchpad) and editing the provided title or providing a completely different title.

Restriction title 115c also indicates that Parent1 has associated the current restriction with a mobile telephone associated with (e.g., used by) Kid1 (referred to as "mobile telephone" in the restriction title 115c). Again, the mobile telephone may have been selected by Parent1 from a list of available mobile devices associated with Kid1. The list of mobile devices may be automatically populated by wireless service providers with whom Kid1 (or a supervising entity on behalf of Kid1) has an account, or Parent1 may indicate to a parental controls intermediary mobile devices associated with Kid1.

The restriction summary box 115 provides the supervising entity (e.g., Parent1) with a list of particular restrictions that can be applied to the mobile telephone associated with child Kid1. The particular restrictions shown in GUI 100 are Block Text Messages 115d, Block Calls to Students 115e, and Block Music 115f. Restriction summary box 115 also shows that, in this example, the supervising entity has selected all three of the restrictions provided by activating the checkboxes associated with the restrictions 115d, 115e, and 115f. The restriction Block Calls to Students 115e includes a reference to a particular group of users referred to by a label of "Students." The label "Students" has previously been defined by the supervising entity Parent1, or by some other entity (e.g., a school) to represent a particular list of users, as described in more detail below.

In some implementations, rather than providing a particular address into the text entry box 120, the supervising entity can provide a previously defined label that represents the particular address. For example, the supervising entity may have previously stored a home address and labeled the address as "home." The supervising entity then may simply enter the label "home" into the text entry box 120, or select the label in some other fashion (e.g., from a drop-down menu) in order to indicate that the supervising entity wants to enter, edit, or delete restrictions associated with an address having the predefined label "home."

In some implementations, rather than associating a restriction with a particular mobile device used by a child, a restriction may only be associated with the child, and, thus, may be enforced on any device (mobile or not) used by the child. For example, a parent may wish to restrict a child from sending messages to friends while the child is located at school. As such, the parent may restrict the child from using any device to send messages to users whom the parent has identified as friends of the child while the child is located at school. Such a restriction may block the child from sending messages to friends using any mobile device associated with the child (e.g., a mobile telephone, a PDA, or a text messaging device), as well as any other devices to which the child has access (e.g., another child's mobile device into which the child may log in with the child's own identifier or a computer or terminal located in a school computer lab or work station).

Another example of restricting a particular supervised entity from using a particular functionality or communicating with a particular group of users involves a secure government site and a visitor to the site. Visitors to the secure government site who do not have a threshold level of security clearance may be subject to a restriction on sending picture files to others while the visitor is located at the secure government site. However, visitors possessing a requisite level of clearance may not be subject to such a restriction. As such, a visitor without the required security clearance may be blocked from sending picture files using a mobile device associated with the visitor (e.g., a mobile telephone) or a device located at the secure government site (e.g., a computer terminal in a visitors' office used by the visitor while at the site).

Figure 2:
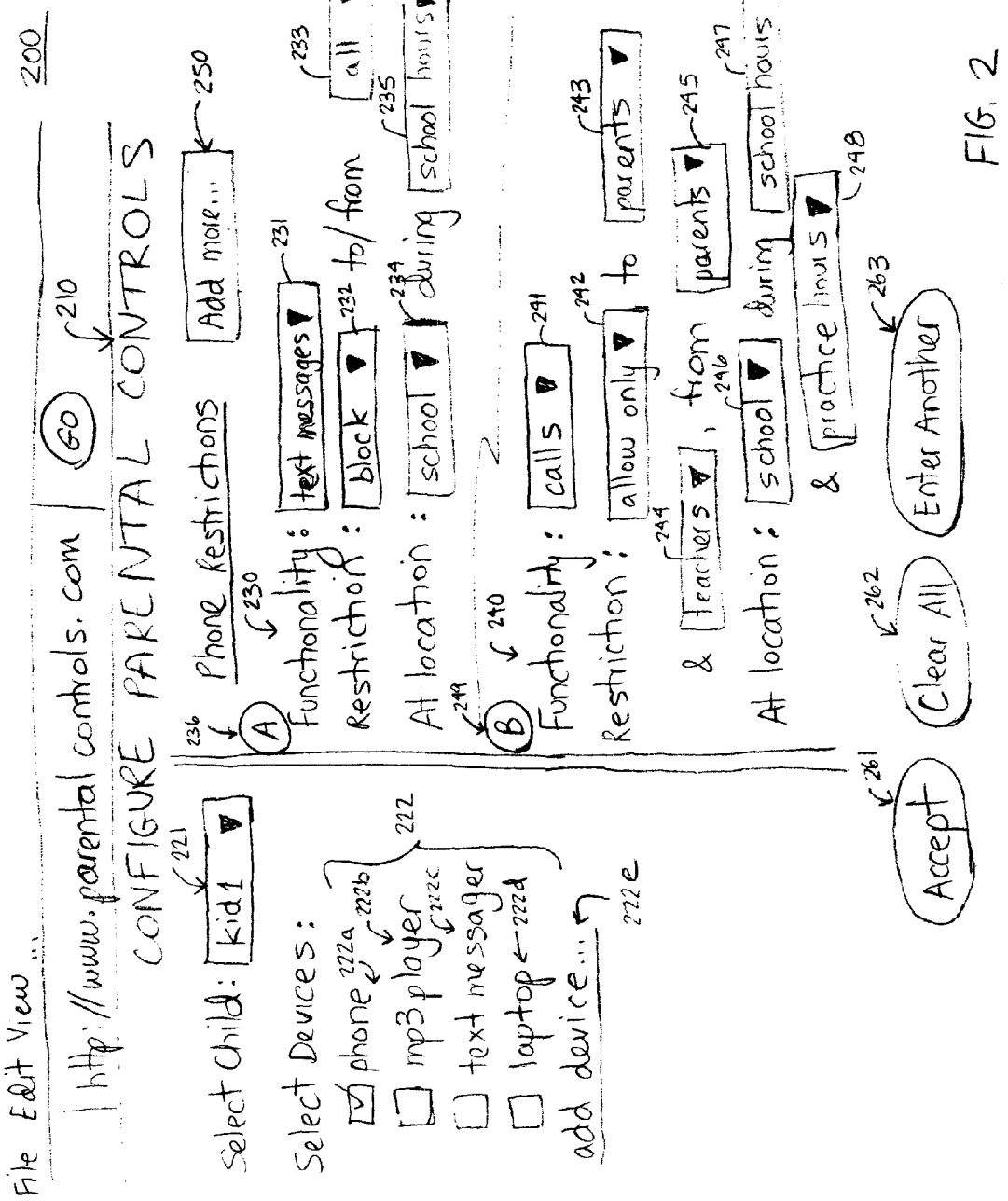
FIG. 2 illustrates an example of a GUI that includes a parental controls configuration web page that enables a parent to register location-based restrictions that regulate the use of a mobile device by a child.

GUI 200 of FIG. 2 includes a parental controls configuration web page 210 that enables a parent to register location-based restrictions on a use of a mobile device by a child. Web page 210 may be associated with a wireless service provider (e.g., a carrier that provides wireless service to a mobile device associated with the child) or a third party parental control service provider (e.g., an intermediary between the parent and the wireless service provider).

A supervising entity may select a child for whom restrictions are to be defined and registered using drop-down menu 221. As shown, the supervising entity has selected a child referred to as Kid1. Drop-down menu 221 may include a list of children who are associated with the supervising entity. For example, if the supervising entity is a parent, the drop-down menu 221 may include a list of all the parent's children; if the supervising entity is a school administrator, the drop-down menu 221 may include a list of all students that attend the school. In some implementations, rather than naming individual children, drop-down menu may include groups of children, such as, for example, Chess Club Members, Football Players, or 10th Graders. Groups of children may be predefined and labeled by the supervising entity (e.g., a parent) that is currently configuring particular restrictions, or by some other supervising entity (e.g., a school). Groups may be defined and labeled at the time a particular restriction is configured or at some earlier time. Using labels allows one or more restrictions to be applied to multiple children without requiring a supervising entity to duplicate the restriction for each child who belongs to a particular group of children.

After selecting Kid1 from drop-down menu 221, the supervising entity may select a particular mobile device associated with Kid1 using device list 222. GUI 200 shows a telephone 222a, an mp3 player 222b, a text messaging device 222c, and a laptop 222d as the devices that are associated with Kid1 and are available to receive restrictions. As shown in GUI 200, the supervising entity has selected a mobile telephone 222a as the device for which restrictions are to be registered. This is show by the activated checkbox associated with mobile telephone 222a.

In some implementations, the device list 222 may be populated with mobile devices that have previously been associated with child Kid1. For example, if the parental controls web page 210 is associated with a wireless services provider (e.g., a carrier), mobile devices may be automatically included in the device list 222 based on accounts held by, or on behalf of, the child Kid1. In another example, the supervising entity may have previously associated particular mobile devices with child Kid1, and the device list 222 may be populated based on the previous association. Additionally, or alternatively, the supervising entity may manually add mobile devices to be included in device list 222, by selecting hyperlink 222e to add one or more devices to the list. This may be done at the time the supervising entity registers restrictions for a particular mobile device, or at some other time.

Two restrictions, labeled as A 230 and B 240, have been registered for the mobile telephone 222a associated with Kid1. Restriction A 230 is related to text messaging functionality. The supervising entity has selected text message from functionality drop-down menu 231. Functionality drop-down menu 231 also may include other functionalities, such as, for example, telephone calls, instant messages, and playing music. In some implementations, functionality drop-down menu 231 may only include functionalities that are actually available on the selected device (here, the mobile telephone associated with child Kid1). These functionalities may be determined automatically based on, for example, a manufacturer of the selected mobile telephone (which may be determined based on a wireless services account, provided by a supervising entity, or otherwise), or may be manually provided by a supervising entity. Alternatively, functionality drop-down menu 231 may include a list of functionalities associated with the type of device selected (e.g., a list of generic mobile telephone functionalities) or may include a list of functionalities that are not device-specific (e.g., a list of functionalities common to all mobile devices). Functionalities that may be restricted may include, but are not limited to, telephone calls, creation and sending of text or picture messages (e.g., text messages, picture messages, instant messages, emails), initiation of a two-way radio session, posting of information to the Internet, recording music, recording video, taking a picture, playing games, playback of music, playback of video, calendaring, alarm setting, note taking, and using a calculator.

Restriction A 230 is a "block" restriction, which has been selected from restriction type drop-down menu 232. Restriction type drop-down menu 232 may include, for example, block, allow, or allow—only-type restrictions. The text messages that are blocked in restriction A 230 include text messages that are directed to, or received from, all people. The group of users referred to as "all" has been selected from user drop-down menu 233. User drop-down menu 233 also may include, for example, no people (e.g., none), one or more particular groups that may have been predefined and associated with a particular label (e.g., friends or students), or individual people identified by a particular label (e.g., Mom or Grandma) or by specific contact information (e.g., a telephone number, an email address, or an instant message screen name). In some implementations, user drop-down menu 233 may be associated with a contact list (e.g., a mobile telephone contact list) so that the drop-down menu 233 may provide the supervising entity with user-friendly names (e.g., "Mom"), while actually associating restriction A 230 with a particular telephone number (e.g., (703) 555-1234), instant message account (e.g., "Mom11"), email address (e.g., Mom11@aol.com), or other electronic address.

The restriction A 230 also is associated with a particular location labeled "school," which has been selected from location drop-down menu 234. Location drop-down menu 234 may include predefined locations (e.g., "school") that are associated with a geographic address and, possibly, a surrounding boundary. For example, the selected location of "school" may be associated with Washington-Lee High School located at 1300 N. Quincy Street in Arlington, Va., and may include a boundary having a radius of 2 miles around the address. Additionally, or alternatively, the locations may include a particular address (e.g., "1425 K Street NW, Washington, D.C."), a particular address and selected boundary or radius (e.g., "1425 K Street NW, Washington, D.C. and 2 mile radius"), or a name of a business whose address can be determined using a directory service (e.g., "Fish & Richardson P.C. in Washington, D.C."). In some implementations, rather than a street address, a set of coordinates (e.g., latitude and longitude), a zip code (e.g., 20006) or an area code (e.g., 202) may be used to identify a particular location.

The restriction A 230 is also associated with a timeframe of "during school hours," which has been selected from temporal drop-down menu 235. Temporal drop-down menu 235 may include a predefined and labeled time frame (e.g., school hours). A labeled time frame may be associated with a static time frame (e.g., 8:30 AM to 2:30 PM) or may be a time frame that can be dynamically updated by a supervising entity (e.g., a school administration may alter the "school hours" time frame depending on whether school is in session or the students are on vacation). Temporal drop-down menu 235 also may include the capability for a supervising entity to directly specify a particular time frame (e.g., 8:30 AM to 2:30 PM or 0830 to 1430). Thus, restriction A 230 represents a block on text messages to or from any person while the child Kid1 is located at school during school hours.

Restriction B 240 is related to telephone calls, as selected from functionality drop-down menu 241. The restriction B 240 is defined as only allowing (as selected from restriction type drop-down menu 242) calls to the predefined groups labeled "parents" and "teachers" and from the predefined group of "parents" (as selected from user drop-down menus 243-245) at the predefined location "school" (as selected from location drop-down menu 246) during the predefined and labeled time frames of "school hours" and "practice hours" (as selected from temporal drop-down menus 247 and 248). Drop-down menus 241-248 are similar to drop-down menus 231-235, as described above with respect to restriction A 230.

In some implementations, a supervising entity may edit or delete restriction A 230 or restriction B 240 by selecting an A icon 236 for restriction A 230 or a B icon 249 for restriction A 240 using a pointing device. A supervising entity may add an additional restriction for the mobile telephone associated with child Kid1 by selecting an "Add More" control (e.g., button) 250.

Once the supervising entity has completed entering information associated with restrictions for the mobile telephone associated with child Kid1, the supervising entity may register the restrictions by selecting an "Accept" control (e.g., button) 261. Alternatively, the supervising entity may select a "Clear All" control (e.g., button) 262 to remove all restrictions for the mobile telephone associated with the child Kid1. The supervising entity also may select an "Enter Another" control (e.g., button) 263 to register restrictions for another child, or for another device associated with the child Kid1.

In some implementations, a parent can create a particular restriction, associate the particular restriction with a label, and save the restriction for future use. For example, a parent can create a restriction that blocks all telephone calls and text messages while the child is located at a location labeled "home" after 10:00 PM. The parent may label this restriction "weekdays." The parent can also create a restriction that blocks all telephone calls and text messages while the child is located at "home" after midnight. The parent may label this restriction "weekend." The two restrictions, and associated labels, may be stored so that the parent can apply the restrictions to mobile devices associated with one or more children by simply supplying the labels. Fore example, the parent may log into parental controls configuration web page 210, select a child Kid1, and apply the restriction "weekdays" to a mobile telephone associated with the child Kid1 by entering the "weekdays" label. The parent may subsequently log into the parental controls configuration web page 210, select a child Kid2, and apply the same restriction to a mobile telephone associated with the child Kid2, by simply entering the label "weekdays."

In some implementations, the parental controls configuration web page 210 also may be configured to receive additional types of parental controls. For example, a parent may enter content-based controls, such as, defining a list of particular words or phrases that may not be included in a text message, an instant message, or an email created and sent by a child. This type of restriction may be registered in order to ensure that the child does not use offensive language. The same list of words also maybe used to block offensive content from being received by a child from another user.

Figure 3:
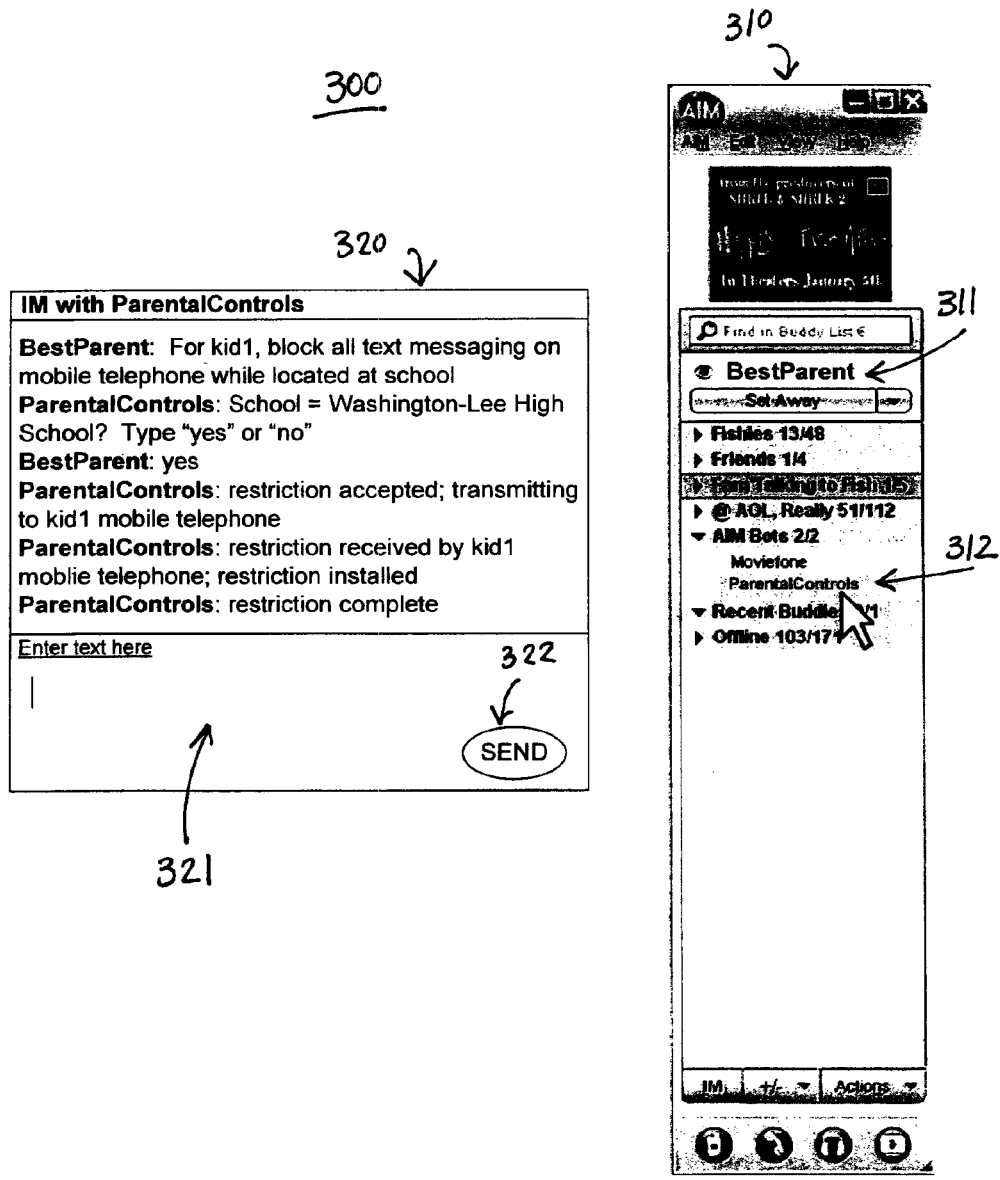
FIG. 3 illustrates an example of a co-user list with a restriction command session that enables a parent to register location-based restrictions using instant messaging on a use of a mobile device by a child.

Co-user list 310 and restriction command session 320 of FIG. 3 enable a parent to register location-based restrictions using instant messaging on a use of a mobile device by a child. Co-user list 310 may be provided to a supervising entity in association with an instant message account. As shown at 311, a supervising entity is associated with an instant message account identified by the identifier (e.g., screen name) of BestParent.

An automated agent (e.g., a bot) for registering parental controls is included as a contact in co-user list 310. The parental controls bot is identified in the co-user list 310 by a screen name of ParentalControls 312. A bot is a program with some artificial intelligence that can be used to perform one or more tasks in lieu of a real person. Supervising entity Best-Parent may select identifier ParentalControls 312 using, for example, a pointer device to initiate a restriction command session 320 with the parental controls bot.

Supervising entity BestParent may provide restriction commands to the parental controls bot in a manner similar to that in which a user would engage in an instant messaging communications session with another user. For example, supervising entity BestParent may provide the command "For Kid1, block all text messaging on mobile phone while located at school" in text entry box 321 and press send control 322. This command is associated with a child referred to as Kid1, a functionality referred to as text messaging, a mobile device referred to as a mobile phone, and a location referred to as school. Each of these words may represent labels that have been predefined by the supervising entity providing the restriction command (e.g., BestParent) or by another supervising entity (e.g., a school), or some combination thereof. For example, the word "school" may be a label that represents a location of "1300 N Quincy Street, Arlington, Va. plus a 2 mile radius." In some implementations, the supervising entity may define labels during the restriction command session 320 by submitting a command such as, for example, "school=Washington-Lee High School" or "school=1300 N. Quincy Street, Arlington, Va. plus 2 mile radius." The commands provided by a supervising entity may be shown in restriction history window 323.

The parental control bot may respond to commands provided by the supervising entity by requesting clarification, providing status information, and/or informing the supervising entity that a particular restriction has been installed (or registered). The command provided by supervising entity BestParent is shown in restriction history window 323. In response to the command, the parental control bot Parental-Controls asks the supervising entity if the word "school" refers to Washington-Lee High School, and requests that the supervising entity respond with "yes" or "no." The supervising entity BestParent responds in the affirmative by providing a "yes" command. The parental controls bot ParentalControls then provides the supervising entity with a series of status updates: (1) restriction accepted, (2) transmitting to Kid1 mobile phone, (3) restriction received by Kid1 mobile phone, (4) restriction installed, and (5) restriction complete.

At this point, the supervising entity may provide an additional restriction command. The additional restriction command may or may not be related to the same child (e.g., Kid1), the same mobile device (e.g., mobile phone), and/or the same functionality (e.g., text messaging). Alternatively, the supervising entity may not provide an additional restriction command, and, in some cases, the supervising entity may close the restriction command window or log off from the instant messaging service.

Figure 4:
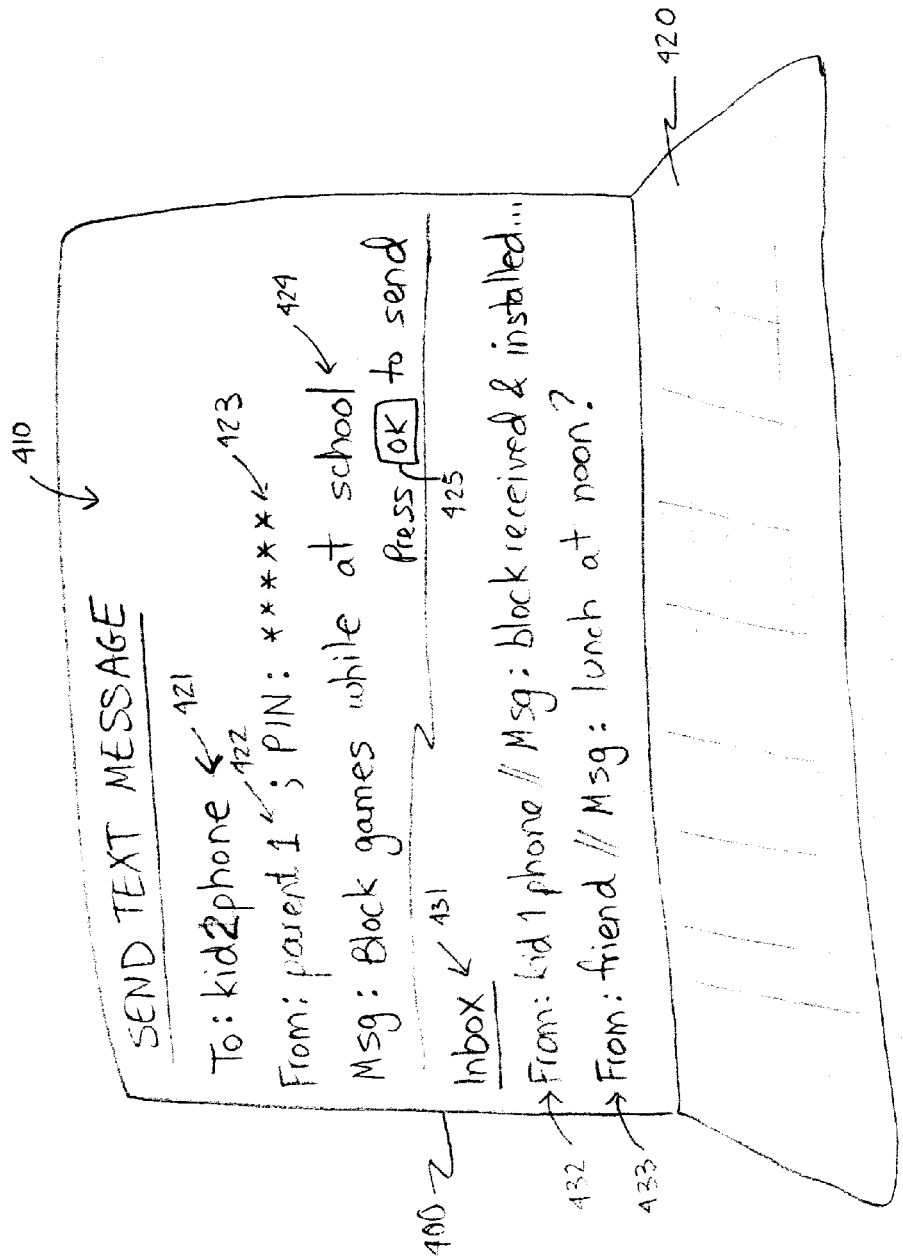
FIG. 4 illustrates an example of a text messaging device that includes a text messaging capability enabling a parent to register location-based restrictions on a use of a mobile device by a child.

Text messaging device 400 of FIG. 4 includes a text messaging capability that enables a parent to register location-based restrictions on a use of a mobile device by a child. Text messaging device 400 may be, for example, a PDA, a mobile telephone, a Sidekick™, or some other device including a screen 410, a keypad 420, and being capable of sending and receiving text messages.

A supervising entity has engaged text messaging functionality of the text messaging device 400 and has entered a text message to another device referred to as Kid2phone. Kid2phone may be a predefined label for a mobile telephone having a particular telephone number and being associated with a child referred to as Kid2. As shown at 422, the text message is listed as being from a supervising entity referred to as Parent1 who is associated with (or is currently using) the text messaging device 400.

The supervising entity Parent1 has provided a password or PIN 423, which is displayed in an encrypted fashion, such as, for example, by displaying stars rather than the characters of the password. Entry of a password associated with a supervising entity (e.g., Parent1) may be required in some implementations to ensure that restriction registration (e.g., adding, editing, or deleting restrictions) for a child's mobile device only may be performed by a supervising entity who has been authorized to restrict the child's use of the mobile device. A password also may be required in order to ensure that the child cannot tamper with restrictions associated with the child's mobile device. In order to authenticate the supervising entity (e.g., in order to ensure that the password or PIN is correct), the supervising entity may be required to log in to the text messaging device 400 with a user identifier (e.g., Parent1) and the password. The user identifier and password provided by the supervising entity then may be compared with a stored user identifier-password pairing to ensure that the restriction registration process is only engaged by an authorized supervising entity.

The body of the text message may include a restriction command similar to that described above with respect to the restriction command session 320 of FIG. 3. As shown, the supervising entity Parent 1 has provided the command "Block games while at school," which refers to a block-type restriction, a predefined functionality labeled "games," and a predefined location labeled "school." The restriction embodied by the command is to be applied to a mobile telephone. The supervising entity has chosen the mobile telephone as the device with which the command is to be associated by sending the command to the mobile telephone associated with Kid2 (e.g., as listed in the "to" field 421). The supervising entity may send the text message command by selecting an OK control 425.

An indication that a restriction registered via text message has been installed on a mobile device associated with a child may be provided to the supervising entity that registered the restriction as a text message. The text message may be deposited in an inbox 431 of the text messaging device 400. As shown, a received text message 432 indicates that a mobile device referred to as Kid1phone has received and installed a block restriction previously sent by text message command from the text messaging device 400. The inbox also may display text messages that are not related to restriction registration, such as, for example, text message 433 from a user referred to as friend that includes the message "lunch at noon?"

Figure 5:
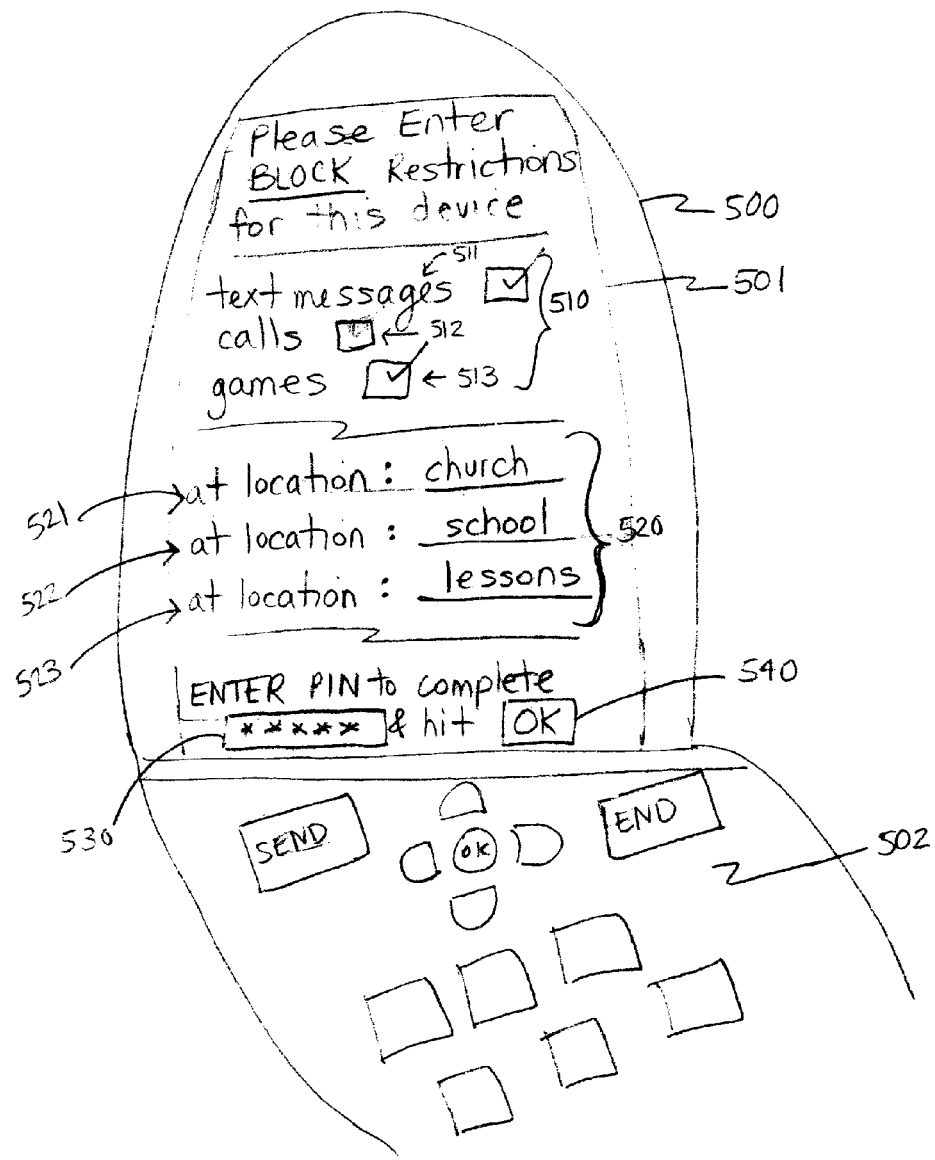
FIG. 5 illustrates an example of a mobile device associated with a child whereby a parent may register location-based restrictions directly into the mobile device on a use of the mobile device by the child.

Child-associated mobile device 500 of FIG. 5 enables a parent to register location-based restrictions directly into the mobile device 500 on a use of mobile device 500 by the child. As shown, mobile device 500 is a mobile telephone having functionality that is restricted based on parental controls. However, mobile device 500 also may include other forms of mobile devices (e.g., a PDA, a text messaging device, an mp3 player, a laptop, or a hand-held computer) having functionality that may be restricted using other forms of controls (e.g., employer controls, government controls, or school controls).

The display screen 501 of mobile device 500 is configured to enable a supervising entity to block selected functionalities of the mobile device 500. In some implementations, the supervising entity may have selected a block-type restriction in a previous screen, which prompted display of the present screen 501. Alternatively, the mobile device 500 may only be configured to enable a supervising entity to register block-type restrictions.

The supervising entity may block one or more selected functionalities 510. Functionalities 510 include text messages 511, calls 512, and games 513. The functionalities 510 provided by display screen 501 may represent all functionalities available on mobile device 500, or a subset of the functionalities available on mobile device 500, such as, for example, the functionalities that are most-used by the child with whom the mobile device 500 is associated, the functionalities for which a block-type restriction is available, or a set of functionalities that were previously selected by a supervising entity. As shown by the marked checkboxes, the supervising entity has selected to block text message functionality 511 and games functionality 513. The supervising entity may have selected these functionalities using, for example, keypad 502, a stylus (not shown), or another method.

The selected functionalities of mobile device 500 are blocked at one or more selected locations 520. As shown, the supervising entity has chosen to block the selected functionalities at locations labeled "church" 521, "school" 522, and "lessons" 523. The labels may have previously been associated with locations by the supervising entity entering the restriction on the mobile device or by another supervising entity.

To register the restrictions, the supervising entity is prompted to enter a password or PIN 530, as described above with respect to text messaging device 400 of FIG. 4, and select an OK control 540. Again, the password or PIN may be requested to ensure that the restriction registration process is not tampered with by a child or a supervising entity that is not authorized to register restrictions on mobile device 500.

Parental control definitions GUI 600 of FIG. 6 is configured to enable a parent to define and label locations and groups of people. GUI 600 may be provided to and accessed by a supervising entity as a web page or a mobile device display screen (e.g., mobile telephone display screen or text messaging device display screen). The information included in GUI 600 may be provided by a supervising entity directly using GUI 600 or by some other method, such as, for example, by restriction command via text messaging or instant messaging.

GUI 600 enables a supervising entity to define and label locations 610, such as the predefined and labeled locations discussed above. As is shown, a location definition 620 has been associated with a label 621 "school." A label is a shorthand description by which detailed geographic location information (e.g., an address, a boundary, a radius, or coordinates) is referenced in a restriction. For example, anytime the word "school" is used to refer to a particular location in a particular restriction, the particular restriction may be associated with the information included in location definition 620. Location definition 620 also includes an address 622 of "1300 N. Quincy Street" and a radius 623 of "500 yards." Location definition 620 may be edited by selecting "Edit" control 624, and may be deleted by selecting "Delete" control 625.

Location definition 630 includes a label 631 of "lessons," an address 632 of "1425 K St. NW," and a radius 633 of "2 miles." Location definition 630 also is associated with an "Edit" control 634 and a "Delete" control 635, which may be used to change or remove location definition 630.

A supervising entity may add an additional location definition 640 by providing a label 641 (here, a label of "church" has been provided), an address 642 (not yet added), and a radius 643 (not yet added). Address 642 and radius 643 may be directly provided for new location definition 640 by entering text, by selecting an address and radius (or boundary) from a map (such as, for example, the map 110 of FIG. 1), or by using a directory service to find an address for the new location definition 640. A supervising entity may use a "Select on Map" control (e.g., button) 644 to use a map to select the address 642 and radius 643. In one implementation, upon selecting control 644, the supervising entity may be provided with an interactive map, such as, for example, map 110 of FIG. 1. The supervising entity may use a "Look-Up by Name" control (e.g., button) 645 to look-up an address 642 using a directory service. In some implementations, upon selecting control 645, the supervising entity may be prompted to provide basic information about the location, such as, for example, a business or place name (e.g., "Catholic Church") and a general geographic location (e.g., town, state, or zip code).

GUI 600 also enables a supervising entity to provide people definitions 650. The groups of people discussed above, such as, for example, the group labeled "students," may be predefined using GUI 600. A people definition 660 has a label 661 "students" and includes a list of particular people 662. The list of particular people includes any person having an "@school.edu" email address 663, any person listed in a file named "school.doc," 664, and any person named by a supervising entity referred to as "school" 665. The "school.doc" file may be a dynamic file that a school can update to take into account students who graduate, move to another school, or transfer into the school. As such, a parent or other supervising entity can easily associate a restriction with students at a particular school without updating the restriction every time there is a change in student population. The school (e.g., a school administrator) may be responsible for creating, storing, and maintaining the "school.doc" file, such that a mobile device or parental control intermediary may access the file as needed. Additional people may be added to the group labeled "students," by selecting an "Add More" hyperlink 666.

A people definition 670 has a label 671 "parents," and includes people referred to in list 672 as "Mom" 673 and "Dad" 674. The names "Mom" and "Dad" each may correspond to various instances of contact information (e.g., a home telephone number, a mobile telephone number, an email address, and/or an instant messaging screen name). The particular contact information instance used in a particular restriction may depend on the functionality being restricted in association with the name. For example, if a mobile device is blocked from receiving all telephone calls except those from "Mom," the name "Mom" as included in the restriction may be associated with a mobile telephone number for the child's mother. A supervising entity may add additional people or groups of people (e.g., step parents or grandparents) to the "parents" definition by selecting the Add More hyperlink 675.

Parental control definitions may be provided by a supervising entity (e.g., a parent) that is authorized to register restrictions for mobile devices associated with a particular child or children. For example, a parent may generate a list of people labeled "friends," which may include contact information for children with whom the parent allows a child to communicate. The same parent then may use the label "friends" in a restriction for a mobile device associated with the child. Additionally, or alternatively, parental control definitions may be provided by a supervising entity (e.g., a teacher or school office staff) that does not have the authority to register restrictions. For example, a school administrator (e.g., an attendance office clerk) may generate a list of students that may be used by various restrictions on mobile devices associated with particular children (e.g., a restriction registered by a coach). However, the school administrator may not be a supervising entity that is authorized to register restrictions using the generated list.

Figure 7:
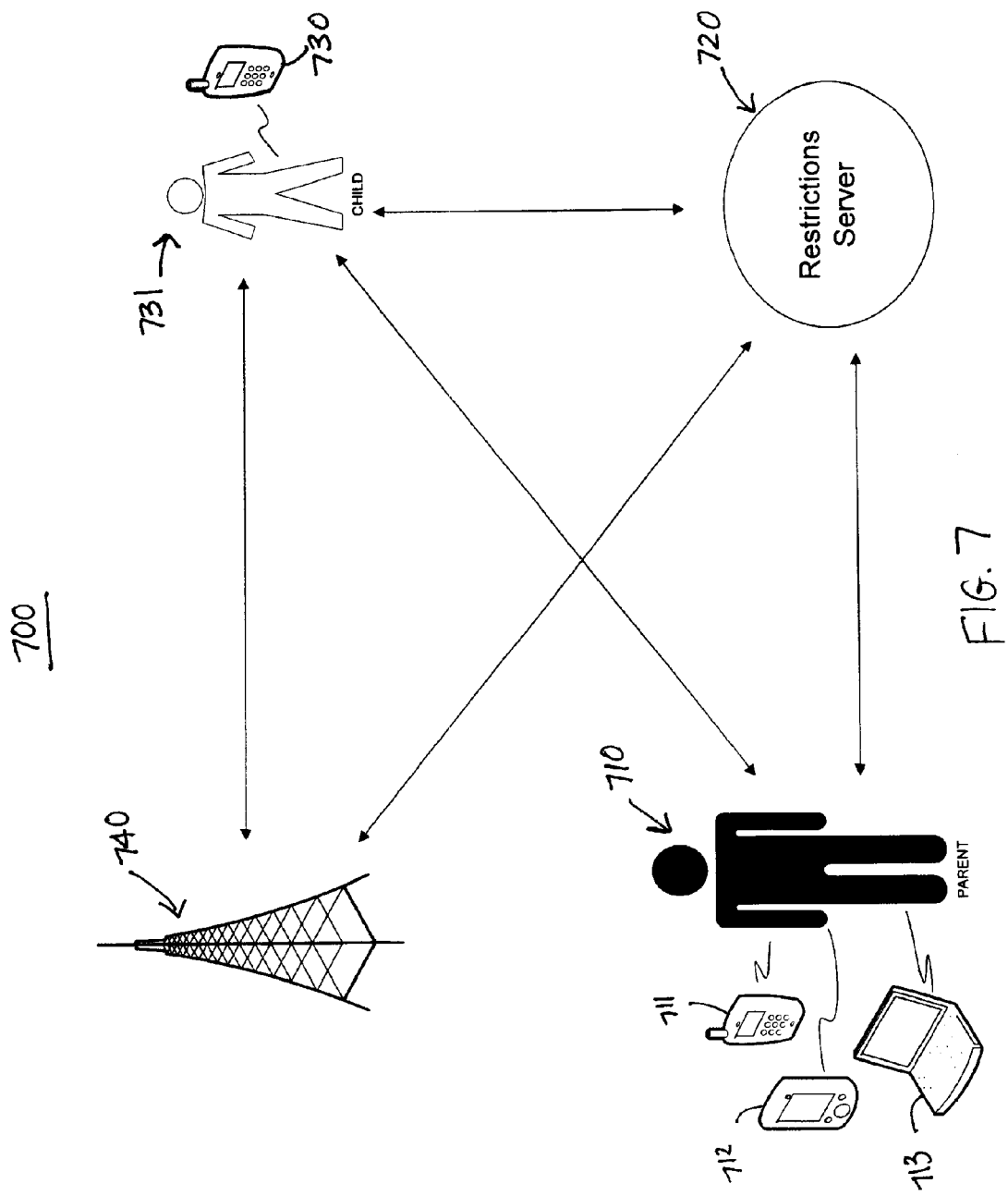
FIG. 7 shows a block diagram of a parental controls registration system.

Block diagram 700 of FIG. 7 shows a parental controls registration system. The parental controls registration system includes components that may be used by various actors to create, edit, delete, register, and store restrictions on functionalities of a mobile device associated with a child.

More particularly, the parental controls registration system includes a supervising entity 710. As described above, the supervising entity may be a parent, a guardian, a school administrator, or a coach who is authorized to register restrictions on mobile device functionalities for children under their supervision. For example, a basketball coach may register restrictions on mobile devices associated with children on the basketball team that are effective when the children are located in the school gym (e.g., at practice or at a home game) or in another school's gym (e.g., at an away game).

To manage restrictions (e.g., enter, edit, and delete restrictions), the supervising entity 710 may use a supervising entity device. As is shown in block diagram 700, the supervising entity 710 has access to a mobile telephone 711, a personal digital assistant (PDA) or a text messaging device 712, and a computer 713. Supervising entity devices also may include other types of communications devices, such as, for example, an mp3 player with communications-capabilities. One or more of supervising entity devices 710, 711, and 712, may include email, Internet, and/or instant messaging applications that may be used by supervising entity 710 to enter, edit, delete, and register restrictions for a child's use of a mobile device.

The supervising entity devices 710, 711, and 712 may be connected to a mobile device 730 associated with a child 731. For example, supervising entity devices 710, 711, and 712 may be configured to communicate with mobile device 730 over one or more of (1) a wireless telephone connection provided by a wireless service provider (e.g., a carrier) represented by tower 740, (2) a wired telephone line (e.g., PSTN), (3) a wireless Internet connection (e.g., a wireless connection between the supervising entity devices 710, 711, and 712 and a network), (4) a wired Internet connection (e.g., DSL, fiber optics, cable), or (5) a short-range network (e.g., Bluetooth™).

Additionally, or alternatively, the supervising entity devices 710, 711, and 712 may be connected to a restrictions server 720. The restrictions server 720 may be associated with a wireless service provider (e.g., a carrier), a parental controls intermediary, one of supervising entity devices 711, 712, and 713, a school, or another actor. Regardless of its affiliation with a particular actor, the restrictions server 720 may be configured to store restriction information locally (e.g., in an associated database), access remotely stored restriction information (e.g., restriction information stored on the mobile device 730, at a school server, on one of supervising entity devices 711, 712, and 713, or at another location), and determine whether a particular attempted use of a mobile device functionality is to be allowed or blocked.

In some implementations, the mobile device 730 may detect an attempted use of a functionality, and may send a request associated with the attempted use to the restrictions server 720 for a determination of whether to allow or block the use. The restrictions server 720 may access restrictions information to determine if a restriction applies to the use associated with the request, and if so, whether the use associated with the request should be allowed or blocked. Once a determination has been made, the restrictions server 720 may respond to the mobile device 730 with an indication of "allow" or "block." In some implementations, the restrictions server 720 may be configured to contact a supervising entity associated with a particular child or a particular restriction in order to determine whether to allow or block a particular request.

The mobile device 730 is shown as a mobile telephone. However, mobile device 730 also may include a laptop computer, a PDA, a text messaging device, a two-way radio, a hand-held computer, an mp3 player, or any other electronic device that is capable of sending and receiving information. Mobile device 730 may be a device that is associated with child 731 or a device that recognizes that it is being used by child 731. Mobile device 730 may include a set of functionalities. The set of functionalities may include, but are not limited to, for example, placing and receiving telephone calls, creating and sending text and picture messages (e.g., text messages, picture messages, instant messages, emails), initiating a two-way radio session, posting information to the Internet, recording music, recording video, taking a picture, playing games, playing of music, playing video, calendaring, setting an alarm, note taking, and using a calculator.

The mobile device 730 also may be configured to determine a location of the mobile device 730. In some implementations, the mobile device 730 may include a global positioning system (GPS) that communicates with a satellite, a nearest tower, or some other service or component to determine a geographic location at which the mobile device 730 is currently located. The determined current location information can then be used by the mobile device 730, or by another actor (e.g., the mobile device 730 can send an indication of current location along with a request to restrictions server 720) to infer a current location of child 731, and thus determine whether a particular restriction should be applied to an attempted use of a functionality of mobile device 730 by child 731.

One or more of the functionalities of mobile device 730 may be restricted based on a rule provided by a supervising entity, as described above. The restrictions may be registered with mobile device 730 either directly or indirectly. For example, a parent may provide a restriction using one of supervising entity devices 710, 711, and 713, and the restriction may be communicated to the mobile device 730. The mobile device 730 may store information associated with the restriction locally, or may send the information to the restrictions server 720 for storage in a database associated therewith, as discussed above.

In some implementations, the mobile device 730 may be configured to determine whether an attempt by a child (or other supervised entity) to use a particular functionality while located at a particular location during a particular time is to be allowed or denied based on one or more restrictions. To do so, the mobile device 730 may access restrictions that have been stored locally at the mobile device 730 or that have been stored remotely (e.g., at restrictions server 720). Additionally, or alternatively, the mobile device 730 may be configured to send a request associated with the attempt to use the particular functionality to another actor for a determination of whether to allow or block the use of the particular functionality. The other actor may include, for example, a wireless service provider (e.g., a carrier) or a parental controls intermediary. The other actor may be associated with the restrictions server 720 and may rely upon restrictions server 720 to perform the determination. In another example, the mobile device 730 may send the request to a supervising entity (e.g., a parent) for a direct determination of whether the attempted use should be allowed or denied.

Figure 8:
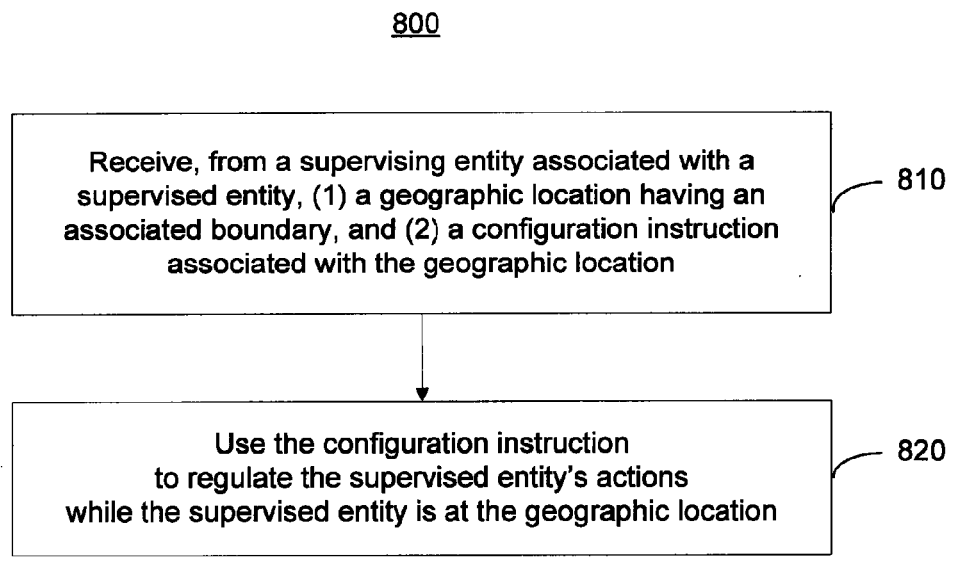
FIG. 8 shows a flow chart that illustrates a process for regulating how a child may use a mobile device.
Figure 9:
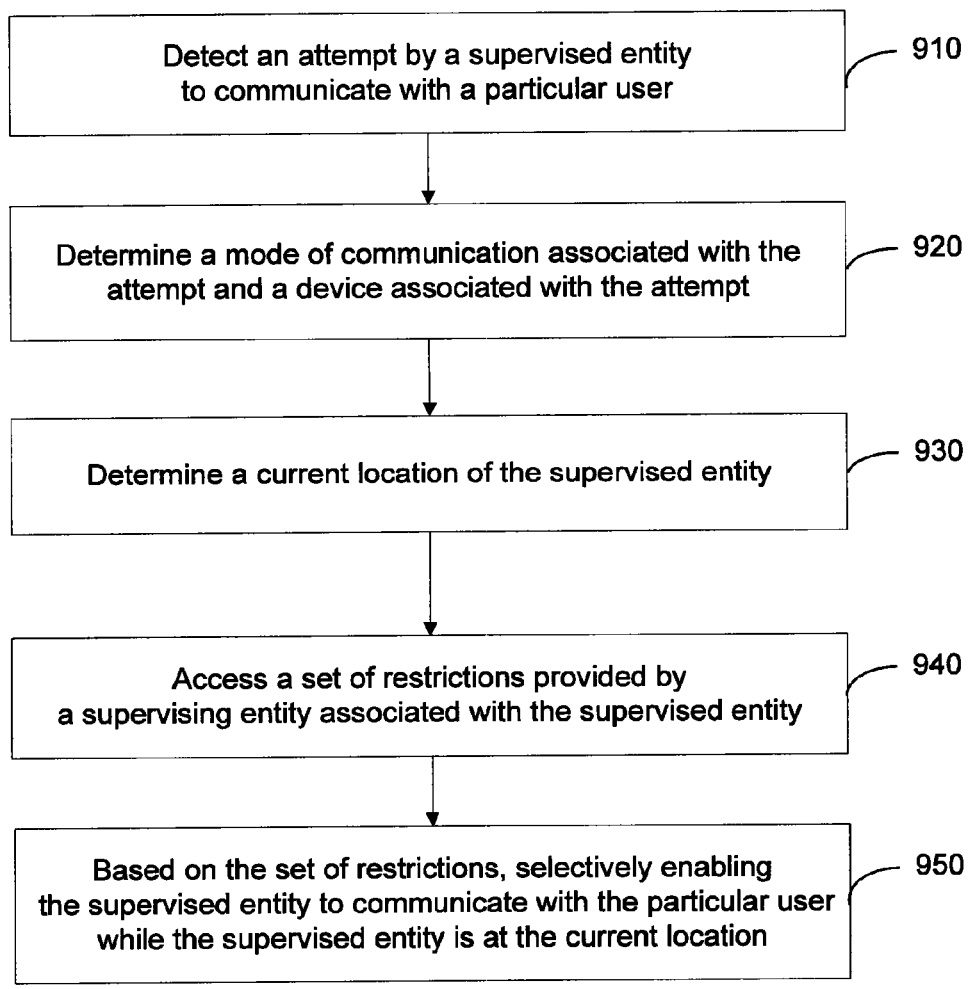
FIG. 9 shows a flow chart that illustrates a process for regulating how a child may use a mobile device.

The components of block diagram 700 will be further described with respect to flow charts 800 and 900 of FIGS. 8 and 9, respectively.

Flow chart 800 of FIG. 8 illustrates a process for regulating how a child may use a mobile device. For convenience, the operations may be referred to as being performed by a processor. Generally, the operations of the process illustrated by flow chart 800 may be used in conjunction with the systems and configurations described earlier with respect to the parental controls registration system of FIG. 7, and the processor may be any one of supervising entity devices 711, 712, and 713, mobile device 730, or restrictions server 720. However, similar methodologies may be applied in other implementations where different components are used to define the structure of the system, or where the functionality is distributed differently among the components shown.

The processor receives, from a supervising entity (e.g., parent) associated with a supervised entity (e.g., child), (1) a geographic location having an associated boundary, and (2) a configuration instruction associated with the geographic location (810). The geographic location and the configuration instruction may be provided by the parent using, for example, one or more of the GUIs shown in FIGS. 1-6.

To provide the geographic location, for example, the parent may enter a particular address, such as, for example, "1300 N Quincy Street." The parent also may select a boundary to be associated with the geographic location, by indicating such a boundary on an interactive map using, for example, a pointing device or a stylus on a touch screen. As shown, the parent has drawn a circle 112, around the address to indicate the boundary.

In some implementations, the configuration instruction may be related to one or more functionalities of a device associated with the supervised entity, such as, for example, mobile device 730. The functionality may be a communications-based functionality (e.g., text messaging) or a non-communications-based functionality (e.g., taking a picture). For example, the configuration instruction may relate to a restriction on a text messaging functionality of mobile device 730.

Additionally, or alternatively, the configuration instruction may be related to a mode of communication. For example, the configuration instruction may relate to a restriction on sending text-based messages, such as instant messages, email messages, and text messages. The mode of communication may be associated, within the configuration instruction, with (1) a particular device associated with a child, (2) any device associated with a child, or (3) a device that is not associated with the child, but which can identify the child as a current user of the device.

In some implementations, the configuration instruction also may be associated with a particular recipient of a communication sent by the child. For example, the configuration instruction may include one or more users (e.g., a list of students) with whom the child is restricted from communicating with while the child is at the geographic location, or with whom the child is enabled to communicate with while the child is at the geographic location. The child may be restricted from communicating with any users on a "friends" list while the child is at the geographic location.

The processor uses the configuration instruction to regulate the supervised entity's actions while the supervised entity is at the geographic location (820). The actions that may be regulated may include use of a communications-based functionality (e.g., text messaging, instant messaging, sending an email, making a telephone call, or posting information to the Internet) or use of a non-communications-based functionality (e.g., taking a picture, recording sound, playing a game, and using a calendar). If a communications-based functionality is restricted by the configuration instruction, the configuration instruction may restrict any actions that attempt to communicate in a particular way (e.g., using a particular mode of communication and/or with a particular user). For example, the child may be restricted from communicating with friends while the child is located at school, regardless of the mode of communication by which the child seeks to communicate with the friends.

Flow chart 900 of FIG. 9 illustrates a process for regulating how a child may use a mobile device. For convenience, the operations may be referred to as being performed by a processor. Generally, the operations of the process illustrated by flow chart 800 may be used in conjunction with the systems and configurations described earlier with respect to the parental controls registration system of FIG. 7, and the processor may be any one of supervising entity devices 711, 712, and 713, mobile device 730, or restrictions server 720. However, similar methodologies may be applied in other implementations where different components are used to define the structure of the system, or where the functionality is distributed differently among the components shown.

The processor detects an attempt by a supervised entity to communicate with a particular user (910). In some implementations, a device by which the attempt is made (e.g., mobile device 730 of FIG. 7) may detect the child's attempt to communicate with the particular user (e.g., create and send a text message). Additionally, or alternatively, the device by which the attempt is made (e.g., mobile device 730) may send a request associated with the attempted use to another actor (e.g., restrictions server 720) for determination of whether the attempt is an attempt to communicate with the particular user.

The processor determines a mode of communication associated with the attempt and a device associated with the attempt (920). For example, the processor may determine that the attempt is an attempt to send a text message using a mobile device associated with a particular child 731, such as, for example, mobile device 730.

The processor determines a current location of the supervised entity (930). The current location of the child may be determined by (1) inferring a current location for the child based on a determined current location of the device associated with the attempt, (2) determining a current location of the child based on tracking information associated with the child, or (3) receiving information directly or indirectly from the child regarding the child's current location.

A wireless service provider (e.g., a carrier), a third party intermediary (e.g., parental controls service provider) and/or mobile device 730 itself may determine a current location of the device associated with the attempt. The current location of mobile device 730 may be determined using a global positioning system (GPS) located within the device or a nearest tower or tower triangulation technique. Once a current location of mobile device 730 is determined, it may be inferred that a child using the device is also located at the determined current location.

A child's current location may be determined based on tracking information. For example, in order to enter a school or other building, the child may be required to scan a key fob or a security card. Scanning the key fob or security card may cause a record of the child's location (e.g., the child arrived at school at 8:00 AM) to be stored. The record of the child's location based on the tracking information then may be used to determine the child's current location.

A child may explicitly provide information about the child's current location. The information may be provided with an attempt to communicate with the particular user, or at another time. For example, the child may be required to indicate a current location (which may be subject to a comparison with a determined current location for the child) before the child may use a particular functionality of a mobile device or communicate with a particular user. In another example, a child may implicitly provide information about the child's current location by, for example, logging into a terminal at a known location.

A set of restrictions provided by a supervising entity associated with the supervised entity is accessed (940). Restrictions may be stored at the device associated with the attempt, or at some external location, such as, for example, a database associated with restrictions server 720, to which the device has access.

Based on the set of restrictions, the processor selectively enables the supervised entity to communicate with the particular user while the supervised entity is at the current location (950). More particularly, the processor may identify one or more restrictions that are applicable to the attempt, and, based on the mode of communication and device associated with the attempt, as well as the identity of the particular user with whom the child is attempting to communicate, the processor may determine whether the attempted communication may be allowed or may be blocked.

For example, a restriction associated with text messaging functionality may include a set of conditions, which are illustrated in Table 1.

TABLE 1

| Child/Device | Functionality | People Type | Location | Restriction Type |
|---|---|---|---|---|
| Kid1 Mobile Telephone | Text Messages | All | School | Block |

When a child (e.g., Kid1) attempts to send a text message to a friend using a mobile telephone while the child is located at school, the text messaging restriction may be enforced against the attempt. In order to determine whether to allow or block the attempt, current conditions associated with the attempt (e.g., a text message functionality of a mobile telephone associated with a child Kid1 while the child is located at school) may be compared with conditions associated with the restriction, as illustrated in Table 2.

TABLE 2

| | Child/Device | Functionality | People Type | Location | Restriction Type |
|---|---|---|---|---|---|
| Restriction Conditions | Kid1 Mobile Telephone | Text Messages | All | School | Block |
| Current Conditions | Kid1 Mobile Telephone | Text Message | Friend | School | N/A |

As shown in Table 2, the restriction may be enforced against the attempt because the current conditions of the attempt are the same as the conditions of the restriction. Thus, in accordance with the restriction type, the attempt may be blocked.

Figure 10:
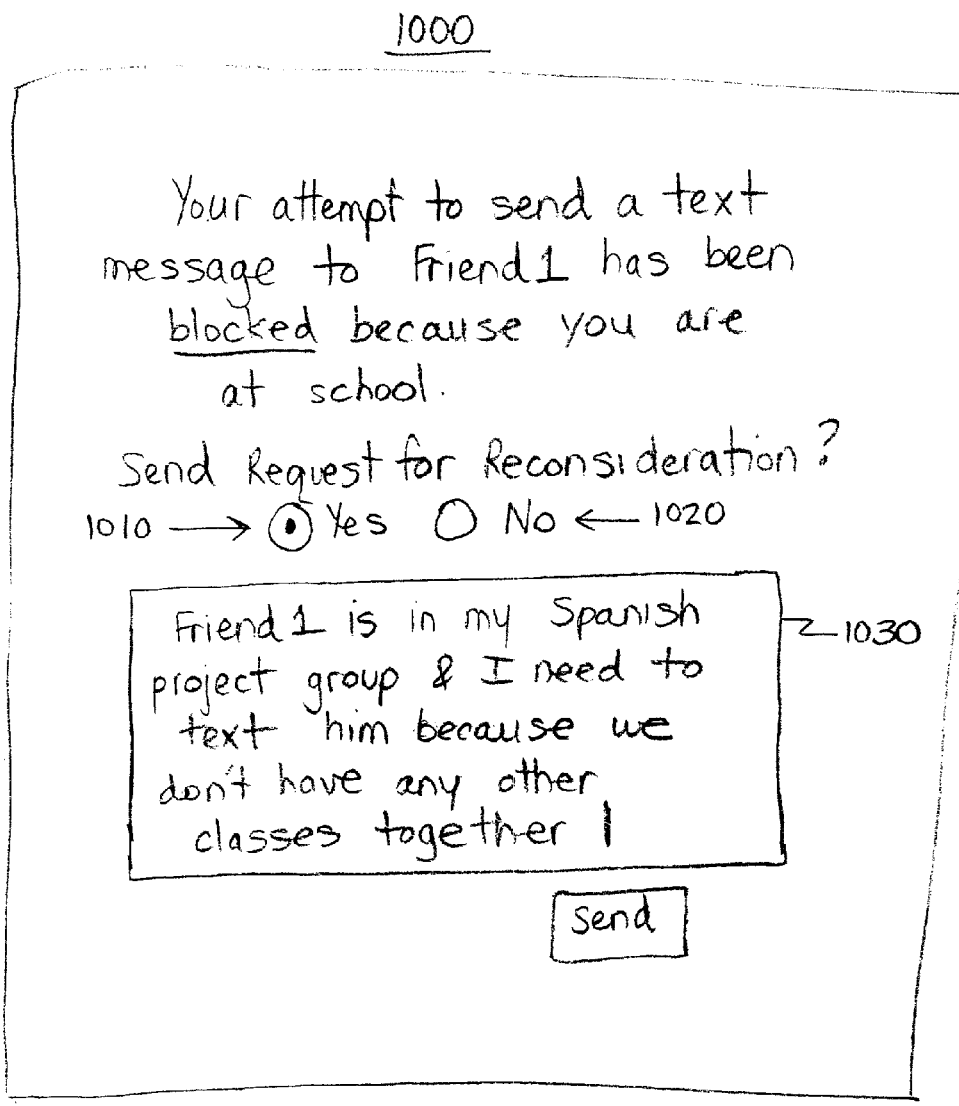
FIG. 10 illustrates an example of a request for reconsideration GUI that enables a child to request reconsideration of a restriction when an attempted use of a particular mobile device functionality by the child is blocked.
Figure 12A:
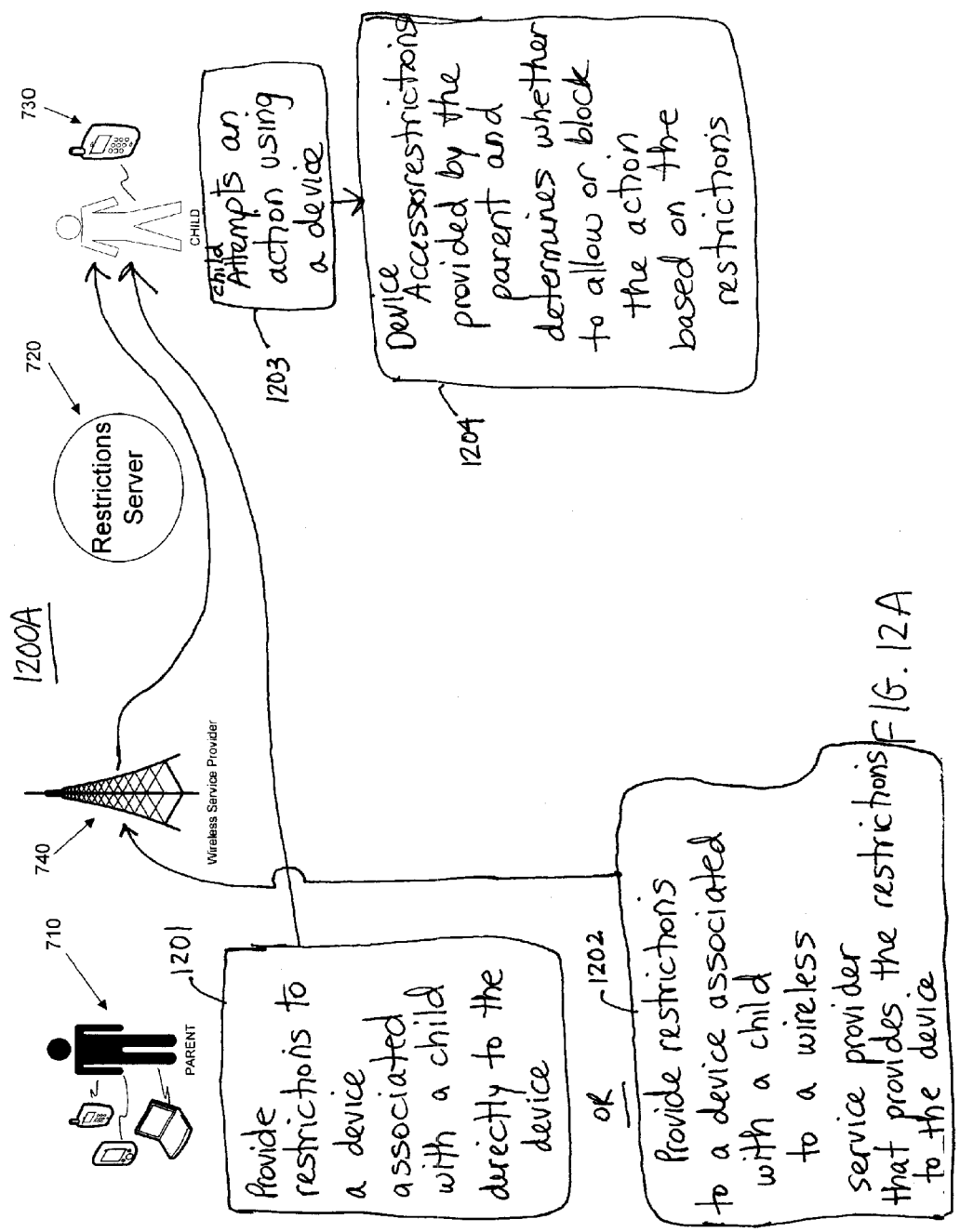
FIGS. 12A-E each shows a flow chart that illustrates a process for regulating a supervised entity's actions while the supervised entity is at a particular location.
Figure 12B:
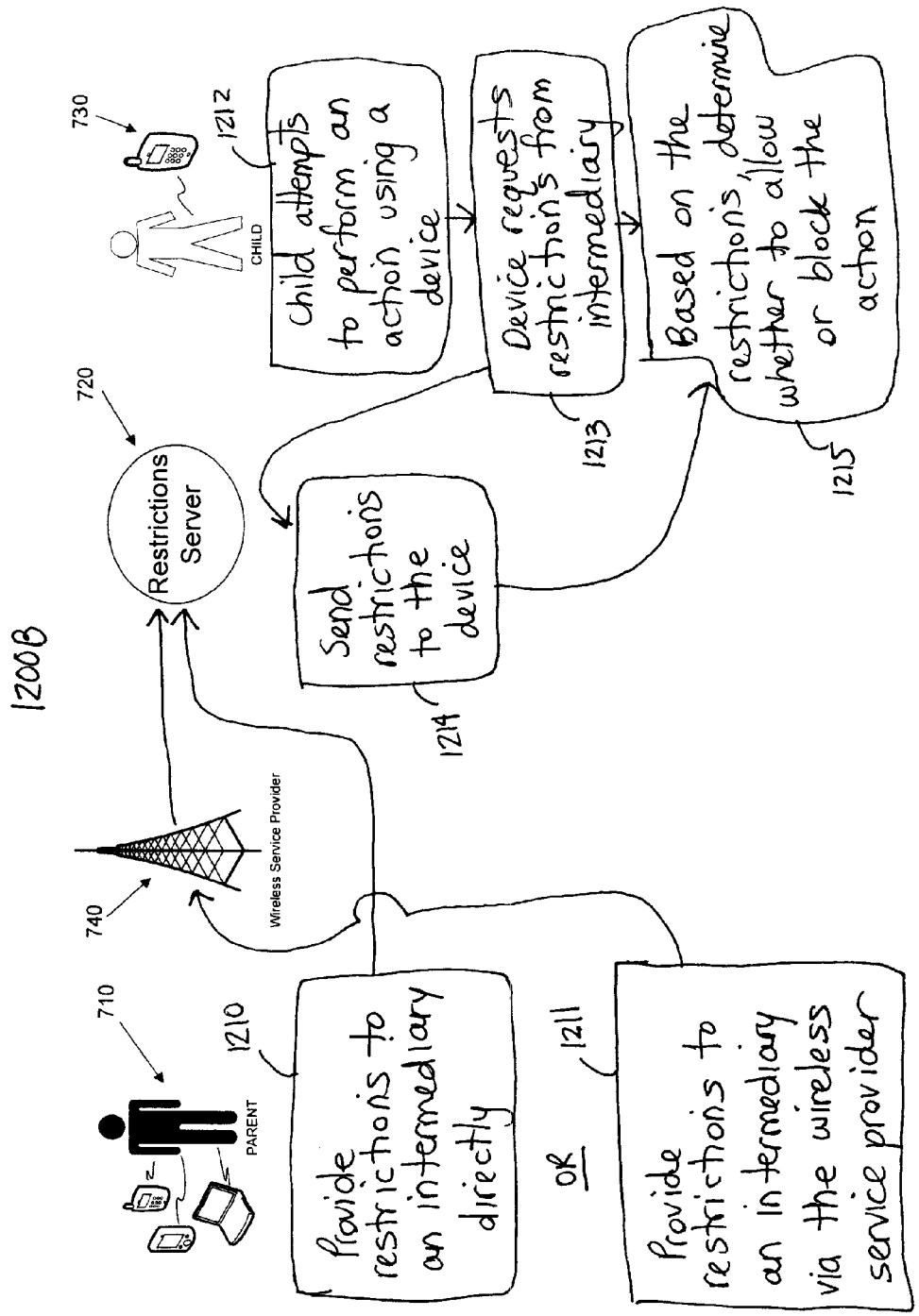
Figure 12C:
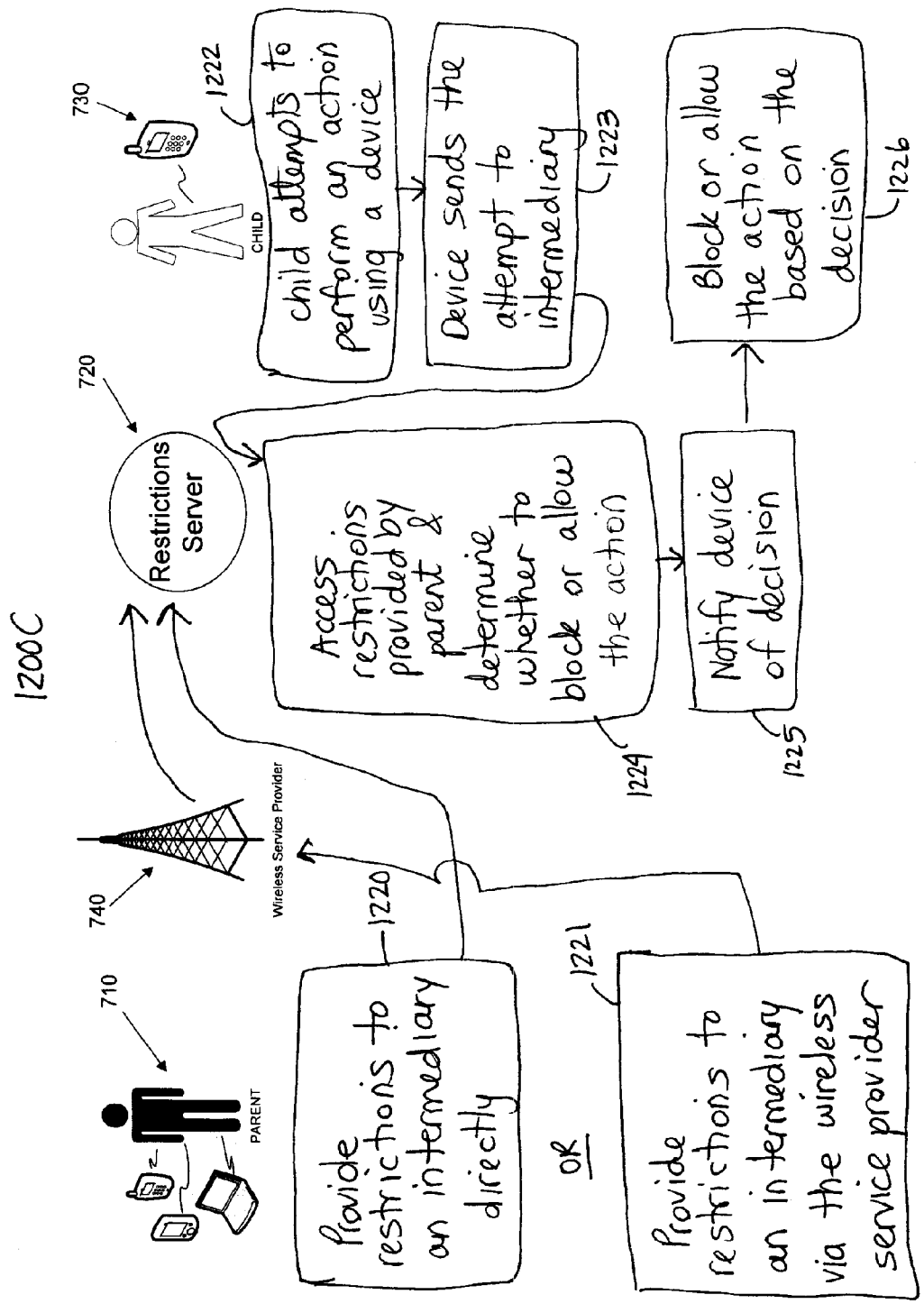
Figure 12D:
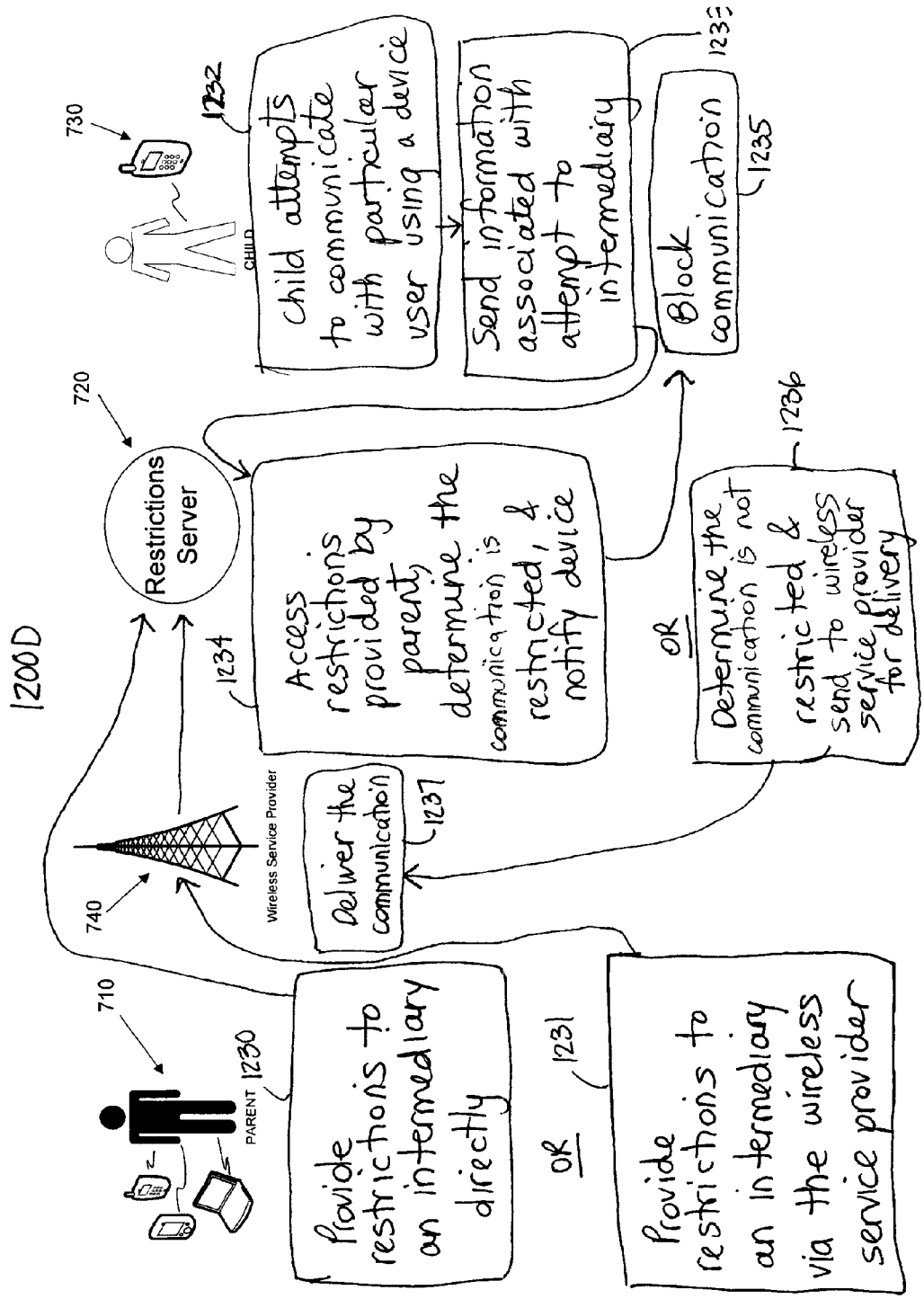
Figure 12E:
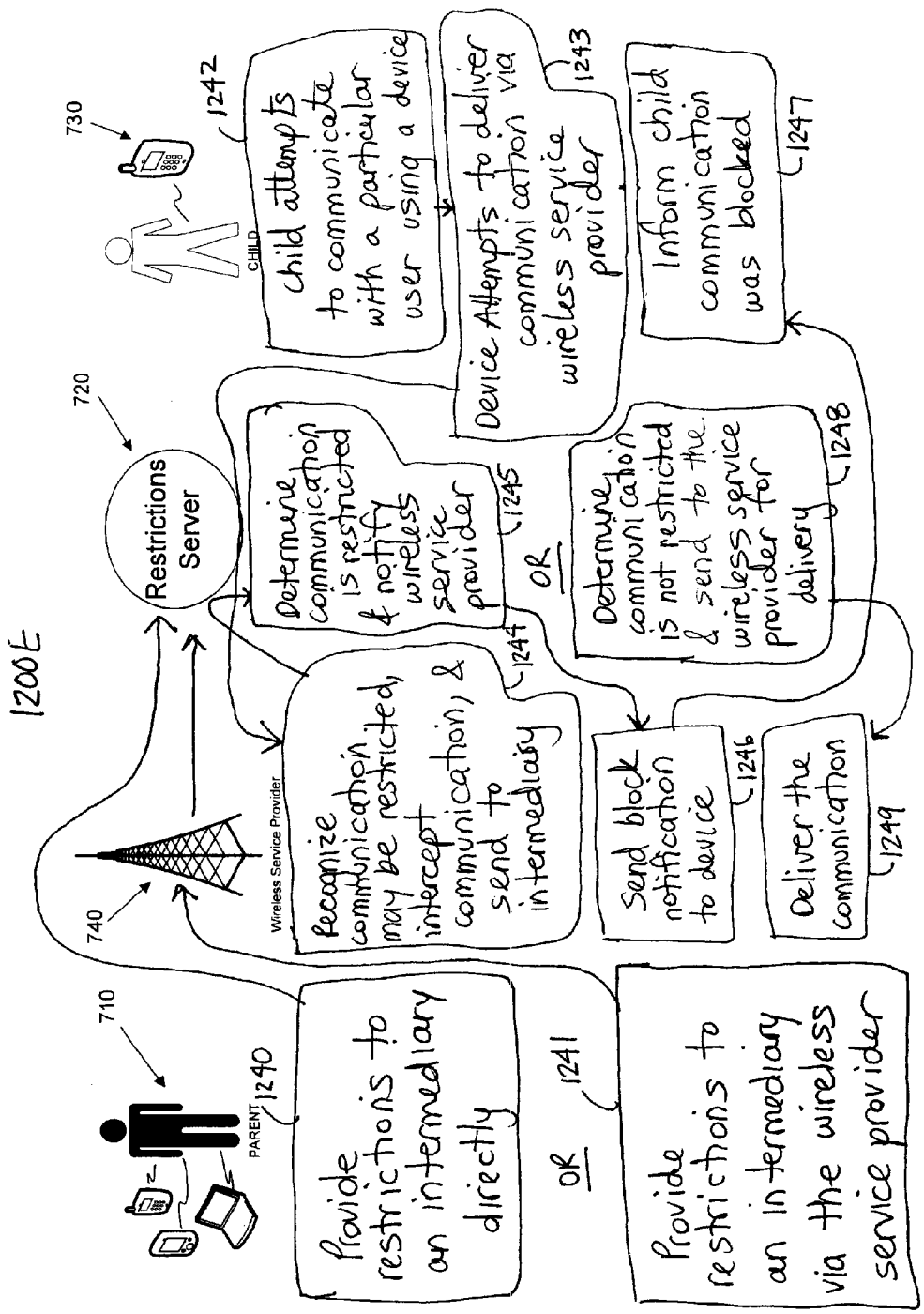

Request for reconsideration GUI 1000 of FIG. 10 enables a child to request reconsideration of a restriction when an attempted use by the child of a particular mobile device functionality is blocked. The child may request reconsideration of the restriction by supplying additional information. As shown, the child's attempt to send a text message to a user identified as "Friend1" has been blocked. GUI 1000 enables the user to send a request for reconsideration of the attempted use by selecting radio button 1010. If the child does not wish to send a request for reconsideration of the blocked functionality, the child may select radio button 1020, or, do nothing, as radio button 1020 may already be selected in a default state of some implementations.

Upon selection of radio button 1010, the child may be presented with text entry box 1030 where the child may provide information associated with the request for reconsideration. Presumably, the child may provide the supervising entity who registered the restriction with a reason why the blocked use should be allowed. As shown, the child has indicated that "Friend1 is in my Spanish project group and I need to text him because we don't have any other classes together."

A supervising entity (e.g., the supervising entity who registered the restriction that caused the attempted use to be blocked) may receive the request for reconsideration by, for example, email, text message, instant message, as an action item displayed when the supervising entity logs into a parental controls web page or interactive GUI, or by some other method (e.g., a voice message). Based on the request for reconsideration, the supervising entity may edit, or delete, the restriction. Alternatively, the supervising entity may leave the restriction in place. The supervising entity also may respond to the request with a reason why the restriction has, or has not, been altered. In some implementations, requests for reconsideration may be included in a restriction report sent to a supervising entity associated with the child, as discussed in detail below.

Restriction report 1100 of FIG. 11 is configured to provide a supervising entity with a report of all (or a subset of all) functionality of a mobile device used, or attempted to be used, by a supervised entity while the supervised entity was located at one or more locations. In some implementations, the restriction report 1100 may be sent to the supervising entity by email, text message, instant message, or by some other method (e.g., a voice message). The restriction report 1100 may be provided to the supervising entity on a regular basis, such as, for example, daily, weekly, or monthly. Additionally or alternatively, the restriction report 1100 may be provided to the supervising entity upon the occurrence of a particular event, such as, for example, the child being blocked from using a particular functionality more than a threshold number of times. Rather than sending the restriction report 1100 to the supervising entity, the restriction report 1100 may be provided to the supervising entity as an action item displayed when the supervising entity logs into a parental controls web page or interactive GUI.

As shown at element 1110, restriction report 1100 has been sent to a supervising entity referred to as Parent1 and is related to use of a mobile device associated with a child referred to as Kid1 during the week of December 1st. The restriction report 1100 is organized based on locations at which the child Kid1 was located when a use, or attempted use, of a mobile device functionality took place. Information related to a location of "school" 1120 is provided in the page of the restriction report 1100 shown. The supervising entity may view other locations (which may not fit on the displayed page) by selecting one of "Prey Location" or "Next Location" hyperlinks 1130 at the bottom of the restriction report 1100. Alternatively, the restriction report 1100 may be organized based on chronology (e.g., when the child used, or attempted to use, the mobile device), allowed vs. blocked uses, recipients of communications sent by, or attempted to be sent by, the child, or in some other manner. The supervising entity who receives restriction report 1100 may be enabled to select a particular organization for the restriction report 1100 or change the organization at the time of receipt of the restriction report 1100 (not shown).

For the location "school," the restriction report 1100 provides information associated with allowed uses 1140 and blocked attempts 1150. Allowed uses 1140 include a text message sent to a recipient referred to as Teacher1 1141 and an email sent to Parent1 1145. In association with each of the allowed uses, a series of controls (e.g., buttons) are provided to allow the supervising entity to revise restrictions based on information associated with the allowed uses. For example, allowed use 1141 is associated with a "Block Use" control 1142, a "Block Recipient" control 1143 and a "View Content" control 1144. The supervising entity may select the "Block Use" control 1142 to add text messages (the use referred to by allowed use 1141) to a list of functionalities that are blocked while the child Kid1 is located at school. The supervising entity may select the "Block Recipient" control 1143 to add the recipient Teacher1 to a list of users with whom the child Kid1 may not communicate while the child is located at school. The supervising entity may select the "View Content" control 1144 to view the content of the text message sent by the child Kid1 to the recipient Teacher1. Selecting the "View Content" control 1144 may enable presentation of another window (e.g., a pop-up window) or control that enables the supervising entity to view the content of the message. In some implementations, a "View Content" control only may be provided for uses, or attempted uses, of text-based functionalities.

Blocked attempts 1150 include a text message sent to a recipient referred to as Friend1 1151 and a text message sent to a recipient referred to as Friend2 1155, which includes the content "Let's skip chem." In association with each of the blocked uses, a series of controls (e.g., buttons) are provided to allow the supervising entity to revise restrictions based on information associated with the blocked attempts. For example, blocked attempt 1151 is associated with an "Allow Use" control 1152, an "Allow Recipient" control 1153, and a "View Content" control 1154, which is similar to the "View Content" control 1144 described above. The supervising entity may select the "Allow Use" control 1152 to enable the child Kid1 to send text messages while located at school. The supervising entity may select the "Allow Recipient" control 1153 to enable the child Kid1 to communicate with the recipient Friend1 while the child is located at school. In another example, blocked attempt 1152, which includes content associated with the blocked text message, is associated with an "Allow Content" control 1157. The supervising entity may select the "Allow Content" control 1157 to enable the child Kid1 to send (or receive) text-based communications that include content that is the same as, similar to, or belongs to the same category as, the text included in the blocked text message. In some implementations, the supervising entity may be enabled to select a portion of the content included in the blocked text message on which to base a new or existing restriction. For example, the supervising entity Parent1 may create a restriction that blocks communications that include the word "skip."

Blocked attempts 1150 also includes an attempted telephone call to a recipient referred to as Grandma 1160. The blocked attempt 1160 is associated with a request for reconsideration 1161 sent by child Kid1 in response to having the attempted telephone call blocked. The request for reconsideration may have been provided by Kid1 using, for example, GUI 1000 of FIG. 10. The request for reconsideration 1161 includes a rationale for the reconsideration—namely "Since Grandma is in the hospital, I want to be able to call her during the day." In response to the request for reconsideration, the supervising entity may select one of an "Allow Use" control 1162, an "Allow Recipient" control 1163, or a "Maintain Block" control 1164. The supervising entity, also may provide a response to the request 1165, regardless of the action (e.g., allow use, allow recipient, or maintain block) chosen by the supervising entity. As shown, Parent1 has elected to respond to the request with the text "You can call after school."

The restriction report 1100 is also configured to enable a supervising entity to view all restrictions associated with the child Kid1 by selecting control 1170. In response to selection of control 1170, the supervising entity may be presented with a GUI configured to list all existing restrictions associated with child Kid1, and receive changes, deletions, or additions to the restrictions. The presented GUI may be, for example, GUI 200 of FIG. 2.

In some implementations, a supervising entity may receive intercepted text-based messages sent by, or attempted to be sent by, a child in addition to receiving an indication of the messages (and their content) in the restriction report 1100. For example, a parent may receive text messages that a child attempted to send, but were blocked. The text-based messages may be sent to the parent by email, instant message, text message, or some other mechanism. In some implementations, the intercepted messages may include a control configured to enable the parent to change or delete a relevant restriction, application of which resulted in an attempted text-based message being blocked. Alternatively, or in addition, the parent may be made able to allow an intercepted message to be sent to its intended recipient without adjusting any restrictions.

Flow charts 1200A-E of FIGS. 12A-E, respectively, each illustrates a process for regulating a supervised entity's actions while the supervised entity is at a current location. Generally, the operations of the processes illustrated by flow charts 1200A-E may be used in conjunction with the systems and configurations described earlier with respect to the parental controls registration system of FIG. 7, and are described as being performed by particular components thereof. However, similar methodologies may be applied in other implementations where different components are used to define the structure of the system, or where the functionality is distributed differently among the components shown.

Referring to flow chart 1200A, a parent 710 provides restrictions to a device associated with a child, such as, for example, mobile device 730, by providing the restrictions directly to the mobile device 730 (1201) or providing the restrictions to wireless service provider 740 (or other intermediary), which provides the restrictions to the mobile device 730 (1202). A child attempts an action using mobile device 730 (1203). For example, the child attempts to send a text message to a particular user or the child attempts to take a picture using a camera associated with the device. Mobile device 730 accesses the restrictions provided by the parent, which have been stored locally at the mobile device 730, and determines whether to allow or block the action based on the restrictions (1204).

Referring to flow chart 1200B, a parent provides restrictions to an intermediary (e.g., restrictions server 720) directly (1210) or indirectly via the wireless service provider 740 (1211). A child attempts to perform an action using a device associated with the child, such as, for example, mobile device 730 (1212). The mobile device 730 requests restrictions that may be applicable to the attempted action from the restrictions server 720 (1213). In response to the request, the restrictions server 720 sends applicable restrictions to the mobile device 730 (1214). Based on the received restrictions, the mobile device 730 determines whether to allow or block the action (1215).

Referring to flow chart 1200C, a parent provides restrictions to an intermediary (e.g., restrictions server 720) directly (1220) or indirectly via the wireless service provider 740 (1221). A child attempts to perform an action using mobile device 730 (1222). The mobile device 730 sends the attempt to the restrictions server 720 (1223). The restrictions server 720 accesses the restrictions provided by the parent, which have been stored at, or in association with, restrictions server 720, and determines whether to block or allow the action based on an applicable restriction (1224). The restrictions server 720 notifies the mobile device 730 of the decision (1225), and in response to the notification, the mobile device 730 blocks or allows the action (1226).

Referring to flow chart 1200D, a parent provides restrictions to an intermediary (e.g., restrictions server 720) directly (1230) or indirectly via the wireless service provider 740 (1231). A child attempts to communicate with a particular user using mobile device 730 (1232). For example, the child attempts to send a text message to a particular user. The mobile device 730 sends information associated with the attempt to the restrictions server 720 (1233). The restrictions server 720 accesses the restrictions provided by the parent, determines that the communication is restricted, and notifies the mobile device 730 that the communication should be blocked (1234). The mobile device 730, in response to the block notification, blocks the communication (1235). Alternatively, the restrictions server 720 determines that the communication is not restricted and sends the communication to the wireless service provider 740 for delivery (1236). The wireless service provider 740 delivers the communication to the particular user.

Referring to flow chart 1200E, a parent provides restrictions to an intermediary (e.g., restrictions server 720) directly (1240) or indirectly via the wireless service provider 740 (1241). A child attempts to communicate with a particular user using mobile device 730 (1242). The mobile device 730 attempts to deliver the communication to the particular user by sending the communication via the wireless service provider 740 (1243). The wireless service provider 740 recognizes that the communication may be restricted, intercepts the communication, and sends the communication to the restrictions server 720 (1244). The restrictions server 720 determines that the communication is restricted and notifies the wireless service provider 740 thereof (1245). In response to the notification, the wireless service provider 740 sends a block notification to the mobile device 730 (1246), which informs the child that the communication was blocked (1247). Alternatively, the restrictions server 720 determines that the communication is not restricted and sends the communication to the wireless service provider 740 for delivery (1248). The wireless service provider 740 delivers the communication (1249).

Restrictions provided by the parent, regardless of a location where the restrictions are stored (e.g., at the mobile device 730, at the restrictions server 720, or elsewhere), may be based on a current location of a child. As such, the current location of the child may be determined before a restriction may be enforced and an action or communication may be blocked or allowed.

In an implementation where the mobile device 730 enforces restrictions directly (e.g., during processes illustrated by flow charts 1200A-C), the mobile device 730 may (1) include GPS functionality that may determine a current location for the mobile device, (2) receive an indication of the current location of the mobile device 730 from a wireless service provider or some other third party system (e.g., a geolocation provider) based on, for example, a determination of a nearest tower or a satellite determination, (3) receive an indication of a current location of a child from a child's own actions or information provided by the child, or (4) receive information regarding the child's current location from another source, such as a service that records tracking information associated with the child.

In an implementation where an actor other than the mobile device 730 (e.g., the wireless service provider 740, restrictions server 720, or other intermediary) enforces restrictions, the mobile device 730 may send an indication of a current location of the child (determined based on a GPS associated with the mobile device 730, or information provided by the child to the actor. Additionally, or alternatively, the actor may determine a geographic location for the mobile device based on, for example, a nearest tower, or for the child based on, for example, tracking information associated with the child which may be made available to the actor.

In some implementations, the mobile device 730 or other actor may periodically determine a current location associated with the child. For example, the mobile device 730 may determine a current location of the mobile device 730, from which a current location for a child associated with the mobile device 730 may be inferred, once an hour in addition to determining a current location of the mobile device 730 at times when a child attempts to perform an action that may be restricted. As such, a location alert may be provided to a parent based on the periodic determination of current location for a particular child associated with the mobile device 730. For example, a location icon may be displayed in connection with the child's name on a co-user list (such as co-user list 310 of FIG. 3) to indicate to a parent the child's current location. Different location icons may be displayed depending on the child's current location. For example, a schoolhouse icon may be displayed when the child is located at school and a house icon may be displayed when the child is located at home or visiting another child's house. If the child is located at an unknown location, a question mark icon may be displayed and the icon may be configured to provide an address associated with the child's current location when the icon is selected. In another example, a parent may receive a message (e.g., text message or instant message) each time the child moves from one location to another.

In some implementations, a school acting as a supervising entity may invoke restrictions by controlling the communication conduits (e.g., spectrum) around a location that includes the school and an associated boundary. For example, the school may prevent all wireless connections attempted by persons using mobile devices within the school grounds from being connected. As a result, mobile devices within the school grounds may receive an indication that wireless service is unavailable. Additionally, or alternatively, a school may partner with a wireless services carrier to block particular functionalities on particular devices for particular users, rather than taking the more extreme measure of blocking all wireless service signals within the school grounds. For example, a wireless service provider may block all users on a list provided by the school (e.g., a list of students) from sending text messages from mobile devices that receive their wireless service from the wireless service provider. In another example, the school may partner with all major wireless service providers to block particular functionalities of mobile devices serviced by the wireless service providers while the mobile devices are located within the school grounds, regardless of identities of users of the mobile devices. These operations may be performed instead of, or in addition to, creation and registration of particular restrictions associated with all students, or some sub-set of students.

The techniques described herein also may be used in other contexts and markets. In one example, a secure government site may use the techniques to block all messages and calls to and from devices that are not on an approved list. As such, the government site may block communications from being sent to, or received from, non-government issue devices to ensure that only government personnel can be contacted by a person who is presently at the site. Additionally, the government may block communications from being sent to, or received from, a mobile device when a user of the mobile device is located at a government site associated with a classification level higher than a particular threshold (e.g., top secret). As such, communications may be sent by, or received at, mobile devices associated with users who are currently located at some government sites, but not others.

In another example, a business may use these techniques to block personal calls and/or text messages sent or received by employees while the employees are at the business location. Additionally, or alternatively, a business may use these techniques to determine which uses of a mobile device by an employee are paid for by the business and which are paid for by the employee. For example, a business may invoke a rule whereby all uses of a mobile telephone by an employee while the employee is located at the business' location (or at an approved client site) may be paid for by the business, while uses at other locations may be paid for by the employee. This may allow an employee to carry a single mobile device, rather than carrying a business mobile device provided and paid for by the business, and a personal mobile device.

The described systems, methods, and techniques may be implemented in digital electronic circuitry, computer hardware, firmware, software, or in combinations of these elements. Apparatus embodying these techniques may include appropriate input and output devices, a computer processor, and a computer program product tangibly embodied in a machine-readable storage device for execution by a programmable processor. A process embodying these techniques may be performed by a programmable processor executing a program of instructions to perform desired functions by operating on input data and generating appropriate output. The techniques may be implemented in one or more computer programs that are executable on a programmable system including at least one programmable processor coupled to receive data and instructions from, and to transmit data and instructions to, a data storage system, at least one input device, and at least one output device. Each computer program may be implemented in a high-level procedural or object-oriented programming language, or in assembly or machine language if desired; and in any case, the language may be a compiled or interpreted language. Suitable processors include, by way of example, both general and special purpose microprocessors. Generally, a processor will receive instructions and data from a read-only memory and/or a random access memory. Storage devices suitable for tangibly embodying computer program instructions and data include all forms of non-volatile memory, including by way of example semiconductor memory devices, such as Erasable Programmable Read-Only Memory (EPROM), Electrically Erasable Programmable Read-Only Memory (EEPROM), and flash memory devices; magnetic disks such as internal hard disks and removable disks; magneto-optical disks; and Compact Disc Read-Only Memory (CD-ROM). Any of the foregoing may be supplemented by, or incorporated in, specially-designed ASICs (application-specific integrated circuits).

It will be understood that various modifications may be made.

What is claimed is:

1. A method for location-based parental controls, the method comprising:

providing, to a parent of a child, an instant messaging communications session window and a co-user list;
receiving, from the parent via the instant messaging communications session window, a parental control command in the form of an instant message comprising:
an input specifying a geographic location having an associated boundary, and
a configuration instruction for controlling one or more modes of communication of a mobile device associated with the child when the mobile device is located within the specified geographic location, wherein the configuration instruction identifies the one or more modes of communication to be controlled;
determining, via a processor, a current location of the mobile device; and
when the current location of the mobile device is within the specified geographic location, using the configuration instruction to regulate how the mobile device associated with the child communicates with other mobile devices using the one or more modes of communication.

2. The method of claim 1 wherein using the configuration instruction to regulate how the child communicates with others using the one or more modes of communication includes using the configuration instruction to regulate how the child communications with others using the one or more modes of communication in association with a particular device associated with the child.

3. The method of claim 1 wherein using the configuration instruction to regulate how the child communicates with others using the one or more modes of communication includes using the configuration instruction to regulate how the child communications with others using the one or more modes of communication in association with more than one particular devices associated with the child.

4. The method of claim 1 wherein using the configuration instruction to regulate how the child communicates with others using the one or more modes of communication includes using the configuration instruction to regulate how the child communications with others using the one or more modes of communication in association with any device that may be used by the child after the child's identity is determined by the device.

5. The method of claim 1 further comprising:
providing, to the parent, a graphical user interface that includes providing an interactive map; and
receiving, from the parent, the geographic location by receiving a selection of a particular address associated with the geographic location and a boundary associated with the particular address.

6. The method of claim 1 further comprising:
providing a text message creation screen on the display of a mobile device, and receiving, from the parent, a text message that includes the geographic location and the configuration instruction.

7. The method of claim 1 further comprising:
providing, to the parent, a graphical user interface on a display of a mobile device, wherein the mobile device includes at least one of a mobile telephone, a personal digital assistant, a text messaging device, a laptop computer, and a hand-held computer.

8. The method of claim 1 wherein receiving, from a parent of the child, the configuration instruction related to one or more modes of communication includes receiving, from a parent of the child, a configuration instruction related to at least one of sending a text message, sending a picture message, sending an instant message, sending an email message, placing a telephone call, initiating a two-way radio session, and posting information to the Internet.

9. A method for location-based controls for communications by a supervised entity, the method comprising:
providing, to a supervising entity associated with the supervised entity, an instant messaging communications session window and a co-user list;
receiving, from the supervising user via the instant messaging communications session window, a supervisory control command in the form of an instant message comprising:
an input specifying a geographic location having an associated boundary, and
a configuration instruction identifying one or more modes of communication of a mobile device associated with the supervised entity and the geographic location; and
using the configuration instruction to regulate, via a processor, how the mobile device associated with the supervised entity communicates with other mobile devices using the one or more modes of communication when the supervised entity is located at the geographic location.

10. The method of claim 9 wherein using the configuration instruction to regulate how the supervised entity communicates with others using the one or more modes of communication when the supervised entity is located at the geographic location includes using the configuration instruction to determine which of the supervising entity and the supervised entity pays costs associated with the supervised entity communicating with others using the one or more modes of communication when the supervised entity is located at the geographic location.

11. The method of claim 9 wherein the supervising entity is a parent, guardian, or relative and the supervised entity is a child of the parent or a child under the care of the guardian or relative.

12. The method of claim 9 wherein the supervising entity is an employer, and the supervised entity is an employee.

13. The method of claim 12 wherein the geographic location is at least one of a location of an employment site and a location of a client site.

14. The method of claim 9 wherein the supervising entity is a school administrator, and the supervised entity is a student.

15. The method of claim 14 wherein the geographic location is a location of a school associated with the school administrator and which is attended by the student.

16. The method of claim 9 wherein the supervising entity is an administrator of a secure government site, and the supervised entity is at least one of a visitor to the secure government site and an employee of the secure government site.

17. The method of claim 16 wherein the geographic location is a location of the secure government site.

18. The method of claim 9 wherein the supervising entity is a library administrator, the supervised entity is a library patron, and the geographic location is a location of a library.

19. The method of claim 9 wherein the supervising entity is a business administrator, the supervised entity is a customer of the business, and the geographic location is a location of the business.

20. The method of claim 9 wherein the supervising entity is a network administrator, and the supervised entity is a network user.

21. The method of claim 9 wherein the supervising entity is a wireless service provider administrator, and the supervised entity is a consumer of the wireless service provided by the wireless service provider.

22. A non-transitory computer program product for location-based controls for communications by a supervised entity, the computer program product including instructions that, when executed by a processor, cause the processor to:
- provide, to a parent of a child, an instant messaging communications session window and a co-user list;
- receive, from the parent via the instant messaging communications session window, a parental control command in the form of an instant message comprising:
- a geographic location having an associated boundary, and
- a configuration instruction identifying one or more modes of communication and the geographic location; and
- use the configuration instruction to regulate how the supervised entity communicates with others using the one or more modes of communication when the supervised entity is located at the geographic location.

* * * * *